(12) United States Patent
Hironishi et al.

(10) Patent No.: US 7,631,378 B2
(45) Date of Patent: Dec. 15, 2009

(54) OPTICAL WAVEFORM SHAPER

(75) Inventors: Kazuo Hironishi, Kawasaki (JP);
Takeshi Hoshida, Kawasaki (JP);
Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 11/094,642

(22) Filed: Mar. 31, 2005

(65) Prior Publication Data
US 2005/0220388 A1 Oct. 6, 2005

(30) Foreign Application Priority Data
Mar. 31, 2004 (JP) .............................. 2004-106961
Dec. 17, 2004 (JP) .............................. 2004-365238

(51) Int. Cl.
*G01B 9/02* (2006.01)
(52) U.S. Cl. ........................................................ 5/477
(58) Field of Classification Search ................ 356/450, 356/477, 478, 482, 483, 491, 492; 385/4
See application file for complete search history.

(56) References Cited

U.S. PATENT DOCUMENTS

| | | | |
|---|---|---|---|
| 4,768,880 A * | 9/1988 | Tur et al. ................... | 356/477 |
| 4,989,979 A * | 2/1991 | Buckman .................... | 356/477 |
| 5,295,205 A * | 3/1994 | Miller et al. .................. | 385/1 |
| 5,703,975 A * | 12/1997 | Miller et al. .................. | 385/16 |
| 5,894,532 A * | 4/1999 | Moores ........................ | 385/11 |
| 5,943,458 A * | 8/1999 | Miller .......................... | 385/39 |
| 5,999,292 A * | 12/1999 | Dennis et al. ............... | 398/101 |
| 6,088,494 A * | 7/2000 | Keck et al. .................... | 385/27 |
| 6,229,633 B1 | 5/2001 | Roberts et al. | |
| 6,356,677 B1 * | 3/2002 | Hall et al. ..................... | 385/15 |
| 6,477,300 B2 * | 11/2002 | Watanabe et al. ............ | 385/42 |
| 6,859,307 B2 * | 2/2005 | Takeda et al. ................ | 359/337 |
| 2001/0021288 A1 * | 9/2001 | Watanabe et al. ............ | 385/15 |

(Continued)

FOREIGN PATENT DOCUMENTS

JP 7-321742 12/1995

(Continued)

OTHER PUBLICATIONS

Kenju Otsuka, "Nonlinear antiresonant ring interferometer," Sep. 1983, Optics Letters, vol. 8, No. 9, pp. 471-473.*

(Continued)

*Primary Examiner*—Gregory J Toatley, Jr.
*Assistant Examiner*—Scott M Richey
(74) *Attorney, Agent, or Firm*—Staas & Halsey LLP

(57) ABSTRACT

The present invention is an optical waveform shaper that utilizes a plurality of interferometers. Each interferometer has one of two types of transfer functions. One type is a first transfer function characterized as having a positive second order derivative of the output optical power in respect to the input optical power. Another type is a second transfer function characterized as having a negative second order derivative of the output optical power in respect to the input optical power. The characteristics of both the first transfer function and the second transfer function are actualized when the input optical power is in the neighborhood of zero and the output optical power shows substantially periodic change with respect to the input optical power. At least one of the plurality of interferometers uses the second transfer function.

23 Claims, 45 Drawing Sheets

U.S. PATENT DOCUMENTS

2003/0002833 A1* 1/2003 Futami et al.
2003/0123784 A1   7/2003 Mukai
2004/0156572 A1* 8/2004 Richardson et al. ............ 385/1
2004/0233935 A1* 11/2004 Yuan et al. .................. 370/474

FOREIGN PATENT DOCUMENTS

JP   9-133825   5/1997
JP   10-293332  11/1998
JP   2003-186067  7/2003

OTHER PUBLICATIONS

Complement. (2003). In the American Heritage Dictionary of the English Language. Retrieved Dec. 3, 2007, from http://www.credoreference.com/entry/4075255.*

B. K. Nayer et al., "concatenated all-optical loop mirror switches", Journal of Modern Optics, 1993, vol. 40, No. 12, pp. 2327-2332.

K. E. Stubkjaer et al., "Wavelength Conversion Devices and Techniques", Proc. 22$^{nd}$ European Conference on Optical Communication—ECOC'96, Oslo, ThB.2.1, pp. 4. 33-4. 40.

* cited by examiner

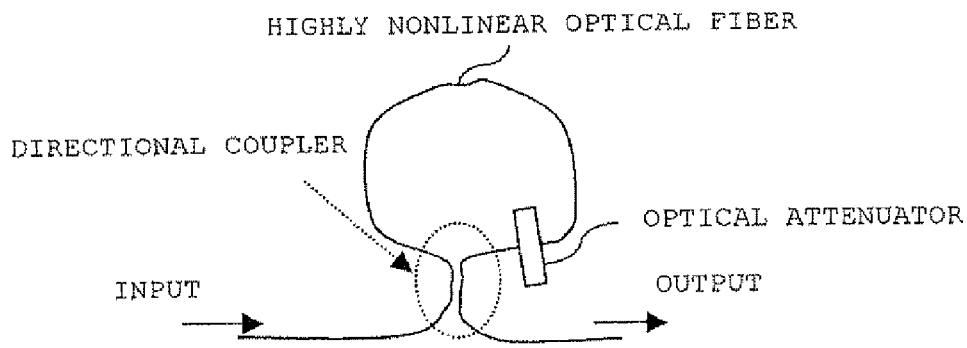
FIG. 1A: Prior Art
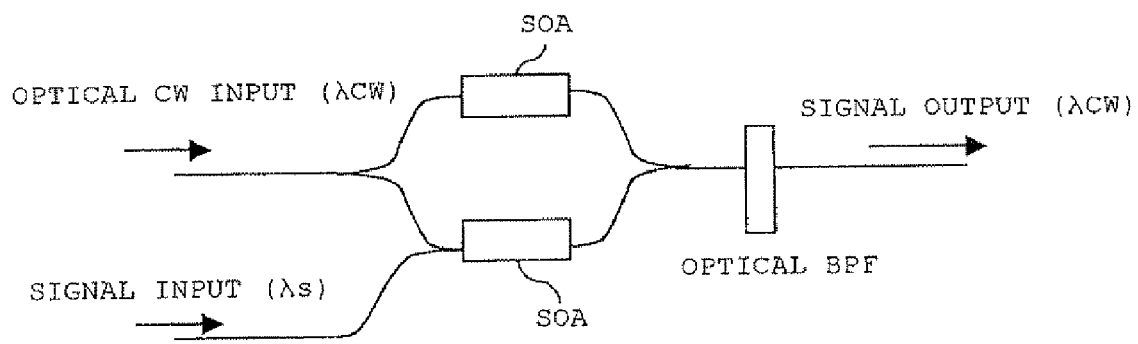
FIG. 1B: Prior Art

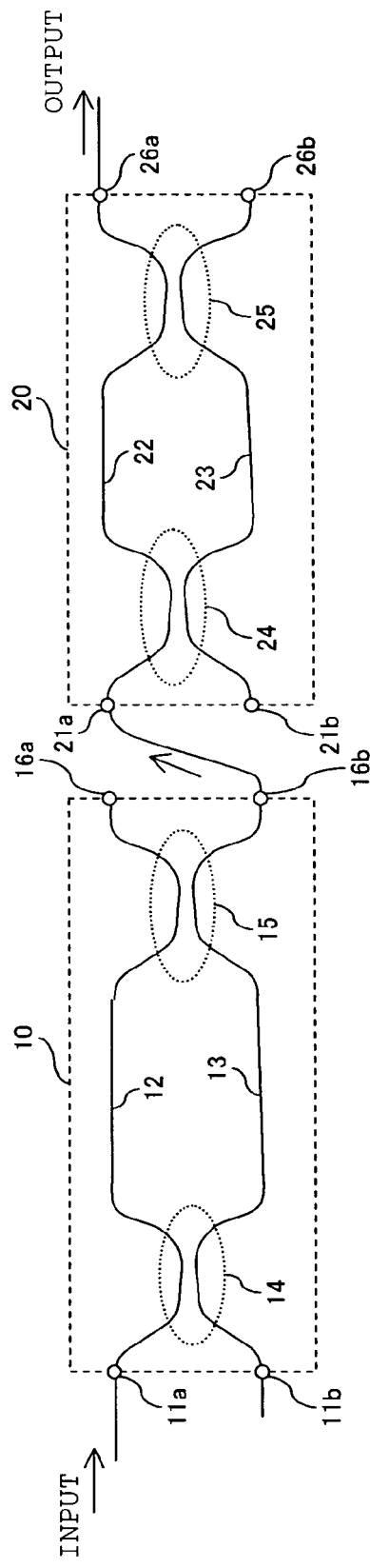
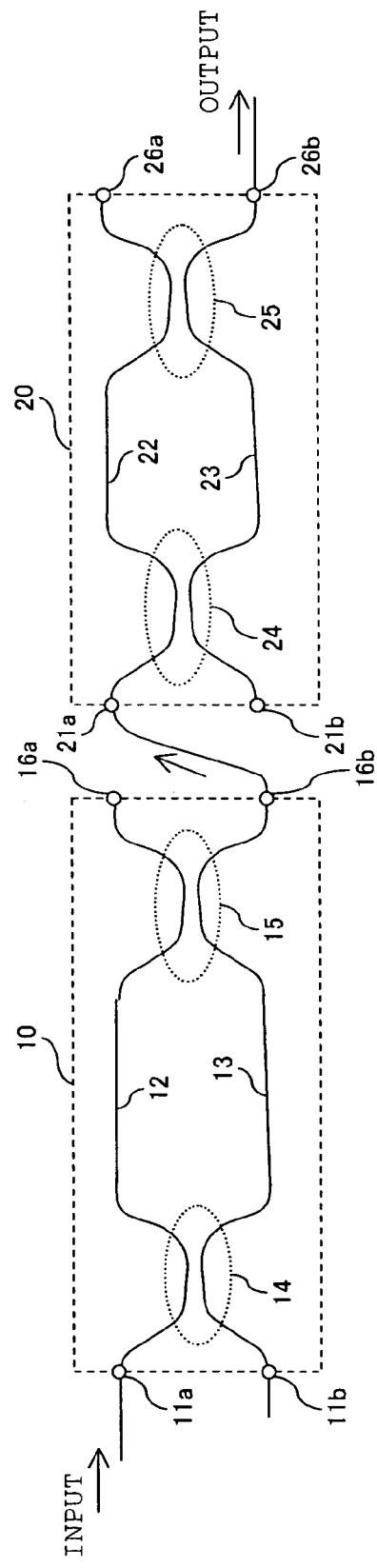
FIG. 8A
FIG. 8B

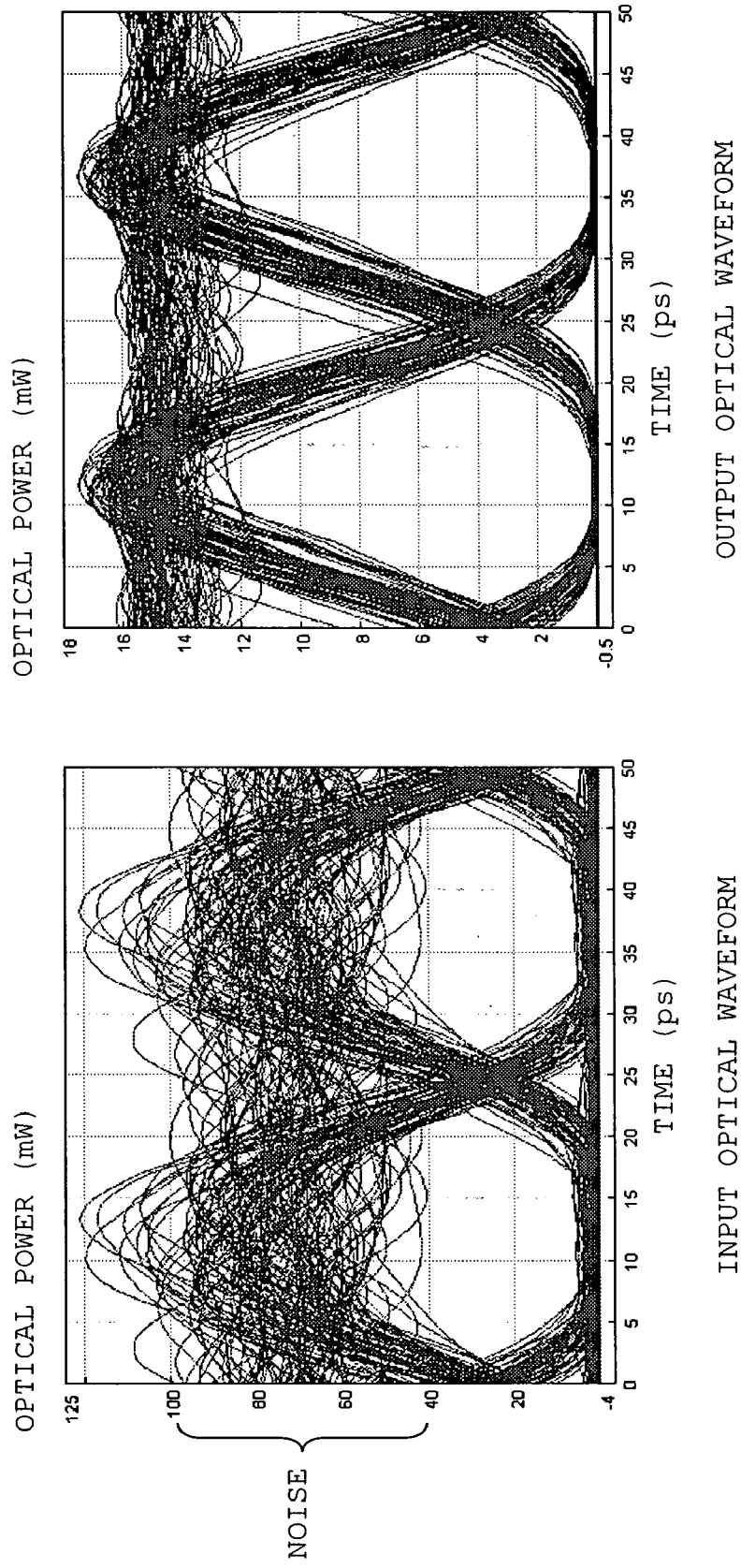
FIG. 13B OUTPUT OPTICAL WAVEFORM
FIG. 13A INPUT OPTICAL WAVEFORM

OPTICAL WAVEFORM SHAPER

BACKGROUND OF THE INVENTION

1. Field of the Invention

The present invention relates to an optical waveform shaper shaping the waveform of optical signals without conversion into electrical signals.

2. Description of the Related Art

In recent years, structures or methods utilizing optical signals have been applied to fields such as communications, signal processing and measurement. Such optical technology seems to show promise of further advances in the future.

In order to improve the S/N ratio of optical signals, it is necessary to reshape the waveform of the optical signal. In optical communication systems, for example, the optical signal transmitted by a transmitter is attenuated with the transmission. Therefore, the waveform of a signal arriving at a receiver is distorted compared with that of the signal transmitted by the transmitter. As a result, the S/N ratio is degraded, posing the potential problem that the receiver cannot demodulate/decode the received signal correctly.

Technology to improve the S/N ratio of optical signals, structures utilizing a Nonlinear Optical Loop Mirror (NOLM) (see Non-patent Document 1, for example) and structures utilizing a wavelength converter (see Non-patent Document 2, for example) are widely known.

The NOLM is, as shown in FIG. 1A, comprised of a directional coupler, a highly nonlinear optical fiber and an optical attenuator. The optical input is split by the directional coupler. In FIG. 1A, one output of the coupler is propagated clockwise in the highly nonlinear optical fiber, and the other output is propagated counterclockwise in the highly nonlinear optical fiber after attenuated by the optical attenuator. These two outputs are coupled by the directional coupler, and the result is output. The output is the regenerated optical input with its waveform shaped. Additionally, Non-patent Document 1 describes an experimental result demonstrating that the waveform-shaping effect can be improved by connecting the NOLM serially.

The wavelength converter, as shown in FIG. 1B, comprises a plurality of semiconductor optical amplifiers (SOA). The optical signal and optical continuous wave (CW) with a wavelength different from the wavelength of the optical signal are input to one semiconductor optical amplifier, and the optical CW alone is input to the other semiconductor optical amplifier. By combining the outputs of these semiconductor optical amplifiers, the wavelength of the optical signal is converted based on the optical CW input. The converted output signal has its waveform shaped. Non-patent Document 2 describes a configuration in which semiconductor optical amplifiers are connected serially.

The following Patent Documents 1 through 4 describe known technologies relating to waveform shaping or pulse regeneration.

<Patent Document 1> Japanese unexamined patent publication bulletin No. 07-321742 (FIG. 10)
<Patent Document 2> Japanese unexamined patent publication bulletin No. 09-133825 (FIG. 1 through FIG. 3)
<Patent Document 3> Japanese unexamined patent publication bulletin No. 10-293332 (FIG. 17 through FIG. 21)
<Patent Document 4> Japanese unexamined patent publication bulletin No. 2003-186067 (FIG. 14)
<Non-patent Document 1> B. K. Nayar, et al. 1993. Concatenated All-optical Loop Mirror Switches. Journal of Modern Optics 40(12): 2327-2332.
<Non-patent Document 2> K. E. Stubkjaer et al. Wavelength Conversion Device and Techniques. Proc. $22^{nd}$ European Conference on Optical Communication. ECOC'96. ThB. 2.1, 1996.

The nonlinear loop mirror and the wavelength converter can shape the waveform of the input optical signal. However, they cannot improve the S/N ratio sufficiently when there is large amount of noise (for example, ASE (Amplified Spontaneous Emission)). It is particularly difficult to improve the S/N ratio when there is large amount of noise on the marked level of the input signal. Here, the "marked level" is the emission state where the optical signal consists of the emission state and the extinction state (or the low emission state). The extinction state is, meanwhile, sometimes referred to as the "spaced level" or "base level".

Non-patent Documents 1 and 2 disclose a configuration with multistage nonlinear loop mirrors or wavelength converters, and state that such multistage configurations yield better waveform-shaping effects compared with single-stage configurations. However, even with a multistage configuration, when the noise level is high and the S/N ratio of the input signal is significantly reduced, the waveform shaping has little effect, and consequently the signal waveform may be, nevertheless, distorted.

SUMMARY OF THE INVENTION

It is an object of the present invention to improve the S/N ratio of an optical waveform shaper to shape the waveform of the optical signal without conversion to an electrical signal.

The optical waveform shaper of the present invention comprises a plurality of interferometers connected in series. Each interferometer has either one of a first transfer function, where the second order derivative of the output optical power with respect to input optical power is positive when the input optical power is in neighborhood of zero and the output optical power shows substantially periodic change with respect to the input optical power, or a second transfer function, where the second order derivative of the output optical power with respect to input optical power is negative when the input optical power is in neighborhood of zero and the output optical power shows substantially periodic change with respect to the input optical power. At least one of the plurality of the interferometers uses the second transfer function.

The characteristics of the optical waveform shaper can be represented by the transfer function expressing the relationship between the input optical power and the output optical power. Here, in the optical waveform shaper with a plurality of interferometers connected in series, the characteristics of the optical waveform shaper can be substantially represented by a synthesized transfer function, in which the transfer functions of each interferometer are synthesized. In order to improve the characteristics of the optical waveform shaper, it is necessary to combine the transfer functions of each interferometer properly.

In the present invention, at least one interferometer has the second transfer function. According to this configuration, a synthesized transfer function, which makes the output optical power substantially constant over a wide region of the input optical power away from zero, can be obtained. When the optical power of the input signal falls within the above region, substantially constant output optical power can be obtained, even though the input signal is noisy.

In the optical waveform shaper, both an interferometer that has the first transfer function and an interferometer that has the second transfer function are present. In such a case, the synthesized function which makes the output optical power substantially constant over a certain range of the input optical power in the neighborhood of zero, in addition to the substantially constant output optical power over a wide region in the input optical power away from zero, is obtained. As a result, noise reduction characteristics can be improved, not only in the "emission level" of the input signal but also in the "extinction level (or lower emission level)".

According to the present invention, a transfer function, in which the output optical power is substantially constant over a wide input power region, can be obtained. For an input signal within the above input power region, therefore, noise can be removed and the optical S/N ratio can be improved.

Because the output optical power is substantially constant over a wide region of the input optical power away from zero, the optical S/N ratio can be improved even if a large amount of noise is generated during the emission state of the input signal.

BRIEF DESCRIPTION OF THE DRAWINGS

FIG. 1A and FIG. 1B describe the related art realizing optical waveform shapers;

FIGS. 8A and 8B describe the second and the third configurations of the optical waveform shaper relating to the present invention;

FIGS. 13A and 13B indicate an example of the waveform shaping effect of the optical waveform shaper of the present invention;

DESCRIPTION OF THE PREFERRED EMBODIMENT

Figure 2:
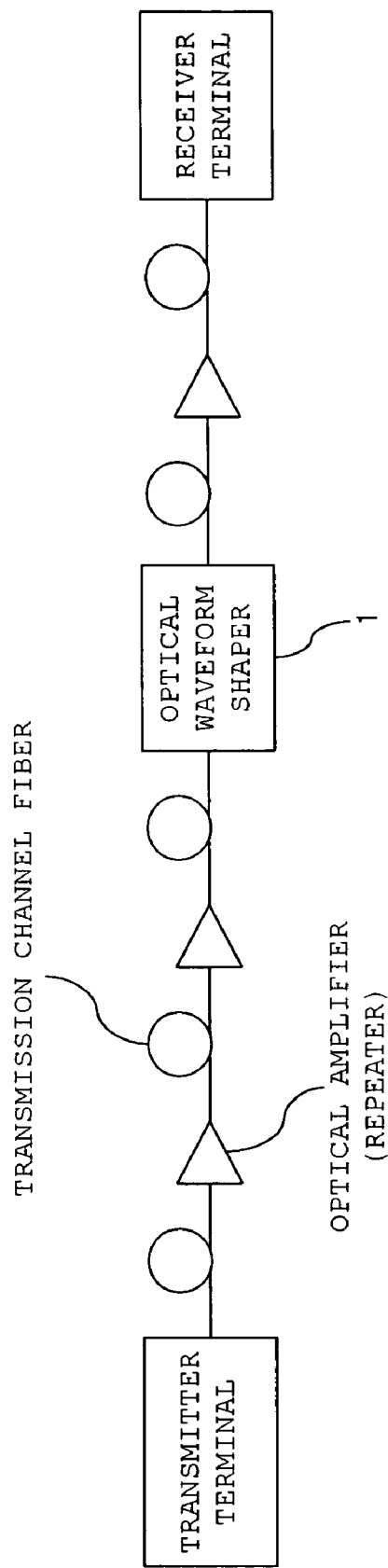
FIG. 2 illustrates an example of an embodiment of the optical waveform shaper relating to the present invention.

FIG. 2 illustrates an example of an embodiment of the optical waveform shaper relating to the present invention. The optical waveform shaper 1 is used in an optical communication system.

In the optical communication system of FIG. 2, an optical signal, amplified by an optical amplifier inserted into the transmission channel, is propagated from a transmitter terminal to a receiver terminal. The waveform of the optical signal is gradually distorted along the length of the transmission channel.

The optical waveform shaper 1 is inserted in the transmission channel between the transmitter and the receiver or in the receiver, and provides an optical 2R function to the optical signal. The optical 2R function refers to regeneration and reshaping of the optical signal without converting the optical signal to an electronic signal.

The optical waveform shaper of the present invention is not to be limited to the above application but is to be utilizable in the fields of optical signal processing and optical measurement, for example.

Figure 3:
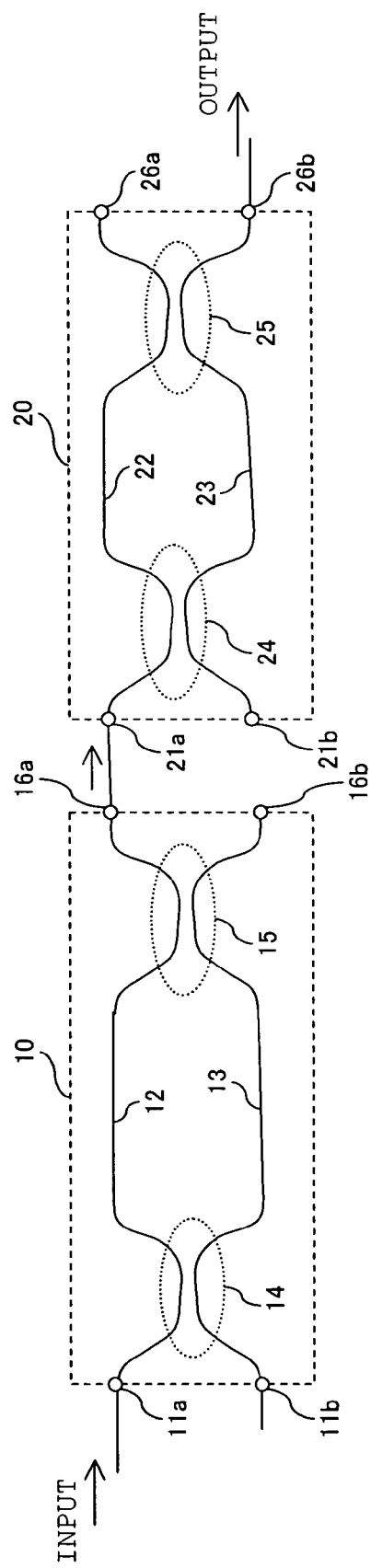
FIG. 3 describes a first configuration of the optical waveform shaper relating to the present invention.

FIG. 3 describes a first configuration of the optical waveform shaper relating to the present invention. The optical waveform shaper of the present invention has a plurality of interferometers connected in series. The description, here, explains an optical waveform shaper with two interferometers connected. Each of the interferometers is a Mach-Zehnder interferometer in this example.

The interferometer 10 comprises the input ports 11a and 11b, the highly nonlinear optical fiber 12, the low nonlinearity optical fiber 13, the approximately 3 dB directional couplers 14 and 15, and the output ports 16a and 16b. The optical signal is input through the input port 11a. In the following description, most examples are assumed to have a highly nonlinear optical fiber and a low nonlinearity optical fiber as the constituent elements of the interferometer, however an optical waveform shaper of the similar configuration can be achieved using semiconducting material optical waveguide, glass material optical waveguide, or other nonlinear material waveguides, including polymeric material and bulk type nonlinear material.

Semiconducting material waveguides include the following (1) through (4) optical waveguides.
(1) An optical waveguide in which the wavelength of the optical signal generates self-phase modulation due to the high third order nonlinearity, caused when the optical signal has a longer wavelength than the absorption edge of the material consisting the optical waveguide.
(2) An optical waveguide in which the wavelength of the optical signal generates self-phase modulation, initiated by alteration in the refractive index by plasma dispersion, caused mainly by carrier fluctuation in the semiconductor optical amplifier, where the wavelength of the optical signal is within the gain band.
(3) An optical waveguide generating self-phase modulation, initiated by alteration in the plasma dispersion and hot carrier generation, caused mainly by carrier fluctuation in the semiconductor optical amplifier, where the wavelength of the optical signal is longer than that of the gain band.
(4) An optical waveguide generating self-phase modulation, initiated by alteration in the refractive index following the change in absorbency, caused by fluctuations of the energy gap of the waveguide material and local voltage fluctuations caused mainly by the charge generation originated by the optical absorption in an electrical-field absorption type semiconducting optical modulator, where the wavelength of the optical signal is within the absorbency band.

The optical signal input through the input port 11a is guided to the highly nonlinear optical fiber 12 and the low nonlinearity optical fiber 13 by the directional coupler 14. The optical signal, propagated through the highly nonlinear optical fiber 12 and the low nonlinearity optical fiber 13, is coupled by the directional coupler 15, and is output through the output ports 16a and 16b. The optical power of the signals output through the output ports 16a and 16b are complementary to each other.

Figure 4A:
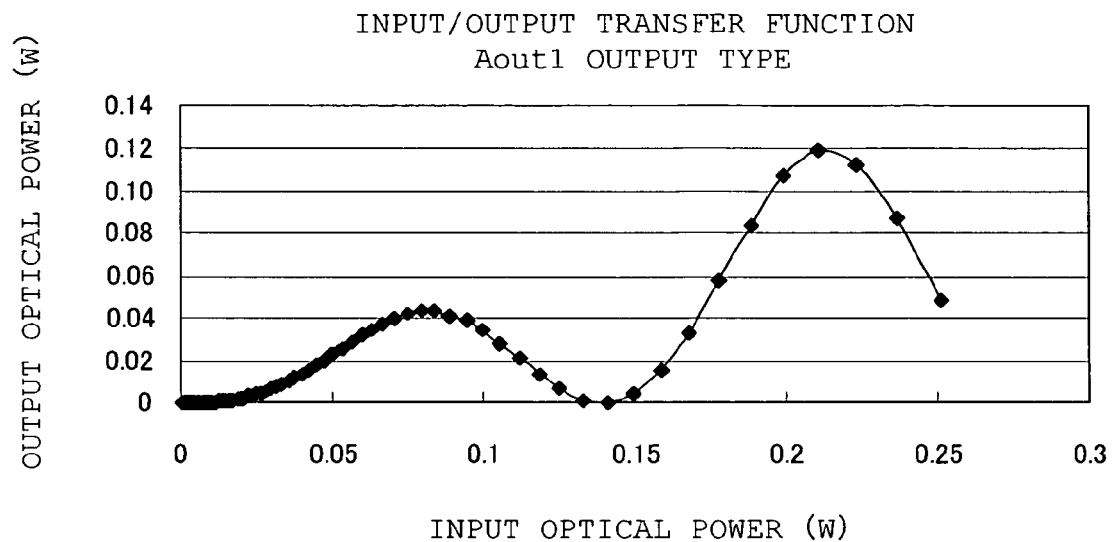
FIG. 4A and FIG. 4B show input/output transfer functions relating to the optical signal outputs from the interferometers.
Figure 4B:
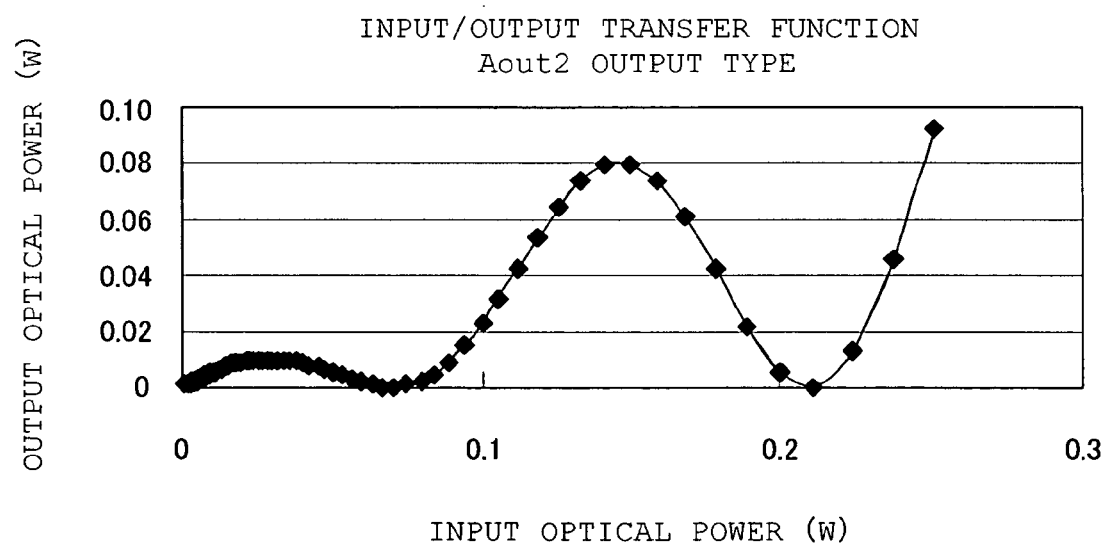

FIG. 4A and FIG. 4B show input/output transfer functions relating to the optical signals output through the output ports 16a and 16b, respectively, of the interferometer 10. Here, the input/output transfer function refers to a relationship between the input optical power (or input optical intensity) and the output optical power (or output optical intensity).

The transfer functions of the optical signals output through the output ports 16a and 16b show a generally periodic change of the output optical power as a function of input optical power. However the characteristics of these transfer functions are different from each other. More specifically, in the case of the transfer function of the optical signal output through the output port 16a, when the input optical power is in neighborhood of zero, the first order derivative of the output optical power with respect to input optical power is substantially zero, and its second order derivative has a positive value. However, in the case of the transfer function of the optical signal output through the output port 16b, when the input optical power is in neighborhood of zero, the first order derivative of the output optical power with respect to input optical power has a positive value and its second order derivative has a negative value. In the following description, the former is referred to as a "positive transfer function" and the latter is referred to as a "negative transfer function".

In this way, the transfer function has the following characteristics when the input optical power is in the neighborhood of zero.

Positive Transfer Function:

$dP_{out}/dP_{in}=0$ (including substantially 0)

$d^2P_{out}/(dP_{in})^2>0$

Negative Transfer Function:

$dP_{out}/dP_{in}>0$ $d^2P_{out}/(dP_{in})^2<0$

The description of the interferometer is provided with reference to FIG. 3. The interferometer 20 has basically the same configuration as the interferometer 10, and comprises the input ports 21a and 21b, the highly nonlinear optical fiber 22, the low nonlinearity optical fiber 23, the directional couplers 24 and 25, and the output ports 26a and 26b. The output optical signal from the interferometer 10 is guided to the input port 21a. The optical power of the signals output through the output ports 26a and 26b are complementary to each other. The optical signal output through the output port 26a is subjected to a positive transfer function, and the optical signal output through the output port 26b is subjected to a negative transfer function.

In the optical waveform shaper of the first configuration, the output from the output port 16a of the interferometer 10 is guided to the input port 21a of the interferometer 20, and the output from the output port 26b of the interferometer 20 is used as the output of the optical waveform shaper. In other words, the signal which is subject to a positive transfer function is output from the interferometer 10, and the signal subjected to a negative transfer function is output from the interferometer 20. The ends of the ports not used for input or for output are anti-reflection terminated by polished obliquely or with an optical isolator.

Figure 5:
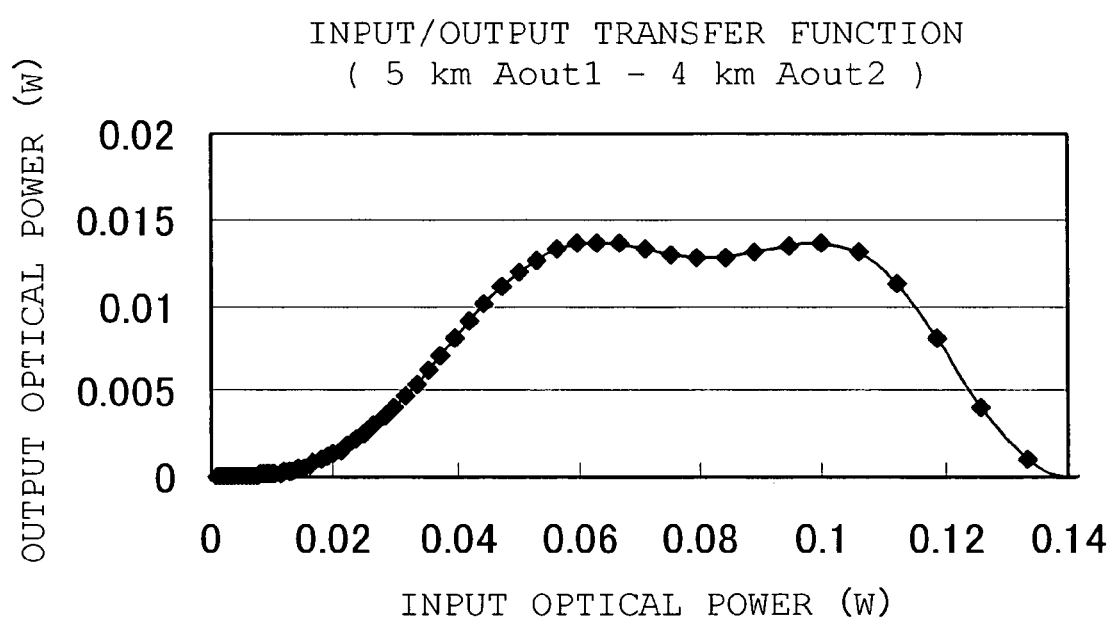
FIG. 5 is shows the transfer function of the optical waveform shaper of the first configuration.

FIG. 5 shows the input/output transfer function of the entire optical waveform shaper (i.e. the combined transfer functions of the interferometers 10 and 20) of the first configuration. Here, the following parameters are given.

The γ value of the highly nonlinear optical fibers 12 and 22: 25.0 (1/(W·km))

The wavelength dispersion of the highly nonlinear optical fibers 12 and 22: −0.5 (ps/nm/km)

The wavelength dispersion slope of the highly nonlinear optical fibers 12 and 22: 0.08 (ps/nm^2/km)

The γ value of the low nonlinearity optical fibers 13 and 23: 1.3 (1/(W·km))

The wavelength dispersion of the low nonlinearity optical fibers 13 and 23: −0.5 (ps/nm/km)

The wavelength dispersion slope of the low nonlinearity optical fibers 13 and 23: 0.08 (ps/nm^2/km)

The length of the highly nonlinear optical fiber 12=the length of the low nonlinearity optical fiber 13=5 km The length of the highly nonlinear optical fiber 22=the length of the low nonlinearity optical fiber 23=4 km The range of input optical power: 0~140 mW In the transfer function of the optical waveform shaper of the first configuration, as shown in FIG. 5, the output optical power increases as the input optical power increases from zero. A substantially constant and stable output optical power can be obtained when the input optical power falls within the range from 50 mW to 110 mW. Therefore, the optical waveform shaper with the first configuration provides a substantially constant and stable optical power output for a wide range of input optical power. This characteristic makes improvement on the optical S/N ratio.

Figure 6:
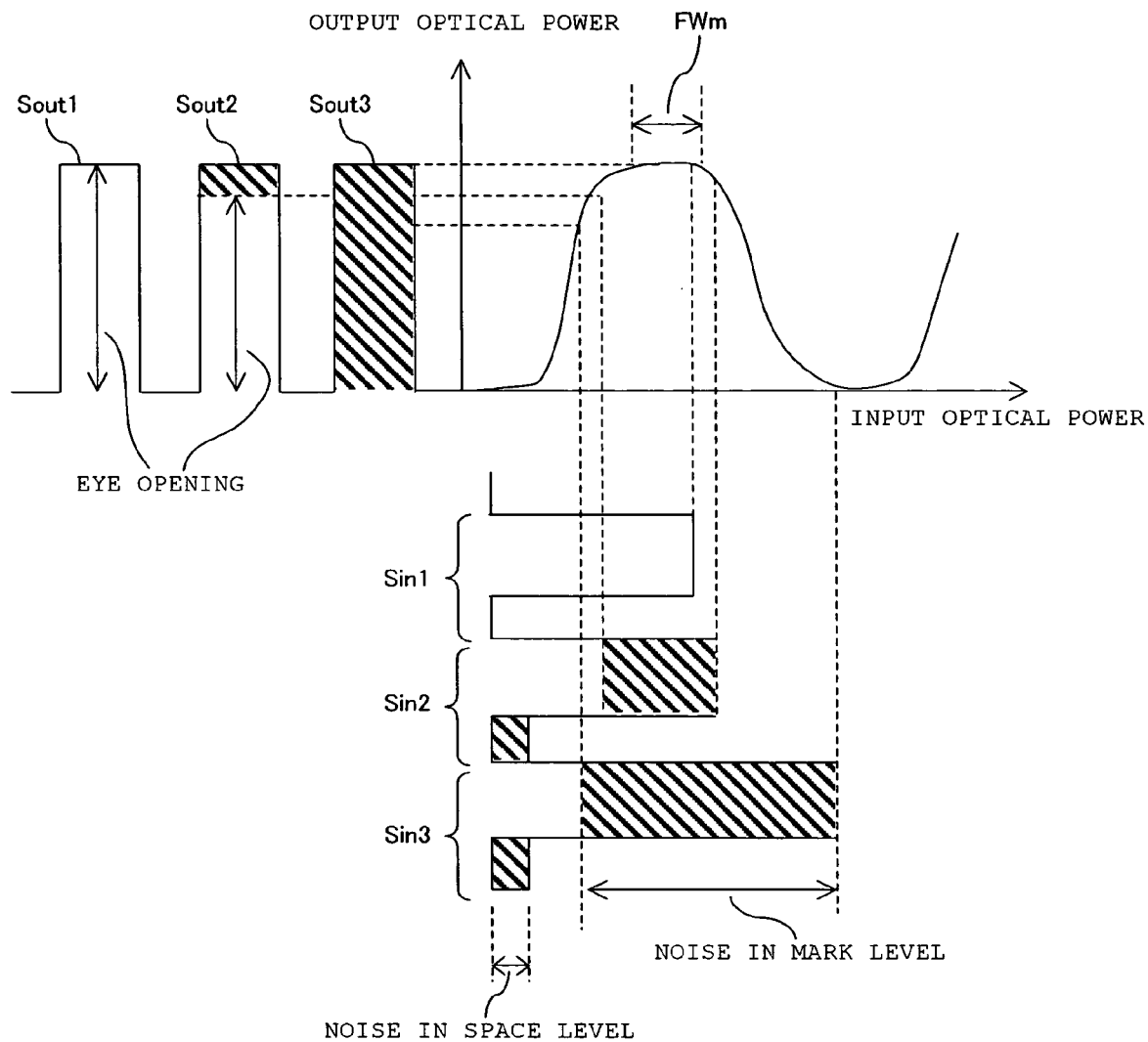
FIG. 6 is a diagram 1 explaining the relationship between the transfer function and the regenerated signal.
Figure 7:
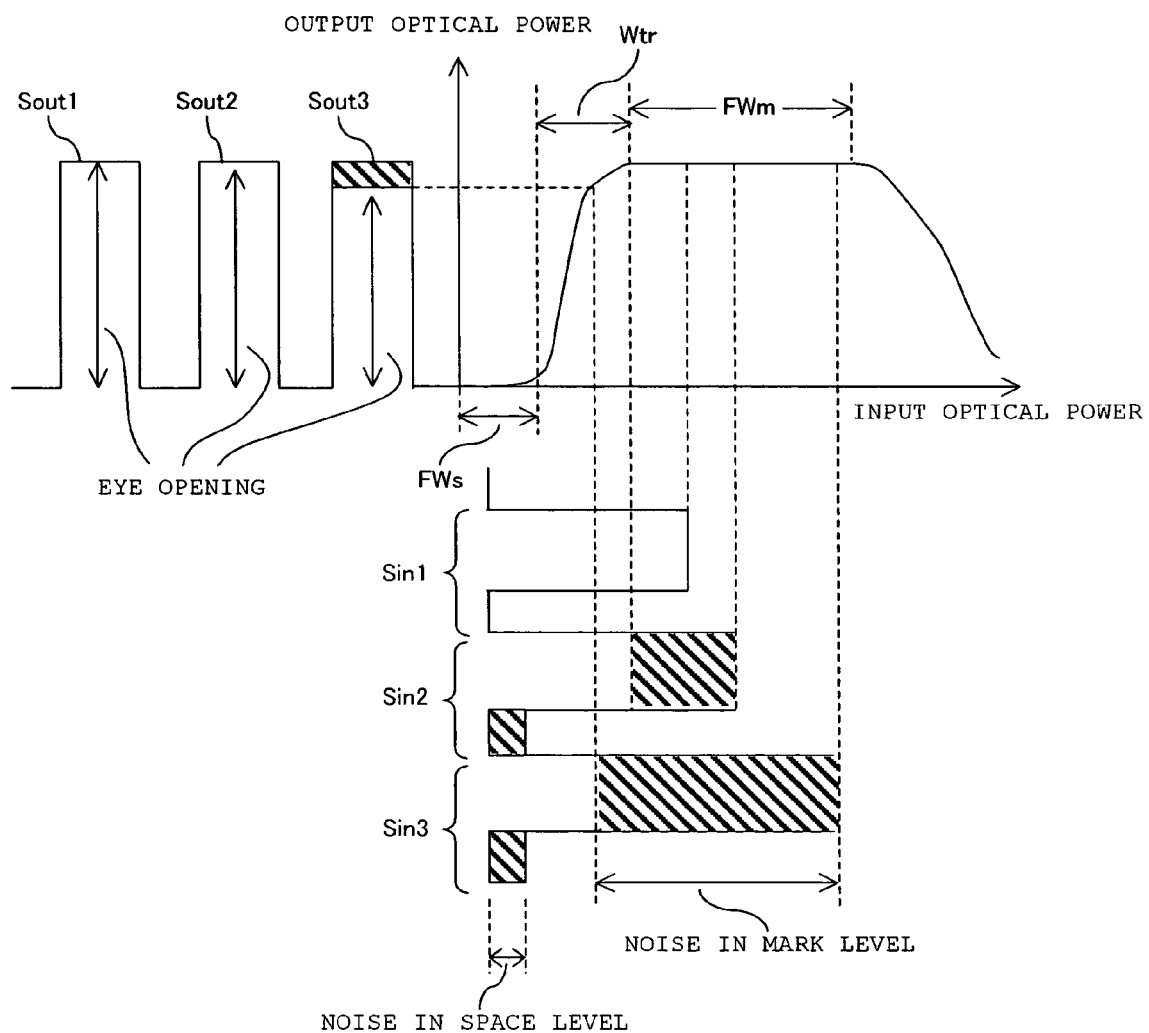
FIG. 7 is a diagram 2 explaining the relationship between the transfer function and the regenerated signal.

FIG. 6 and FIG. 7 explain the relationship between the transfer function and the regenerated signal. In the following description, the high-emission state of the optical signal is referred to as the "marked level" and the low-emission state is referred to as the "spaced level". The range of the input optical power in which the transfer function shows a flat region with respect to change in the input optical power, and the optical output from the optical waveform shaper is in the high-emission state (i.e. mark level) is referred to as the "flat mark region FWm".

FIG. 6 describes signal regeneration in the optical waveform shaper with a narrow flat mark region FWm. The optical signals Sout1 through Sout3 represent the optical outputs resulting from the input of the optical signals Sin1 through Sin3, respectively. The optical signal Sin1 is an ideal optical signal without any noise. The optical signal Sin2 is an optical signal with a little noise. The optical signal Sin3 is an optical signal with a large amount of noise (having noise in its marked level, i.e. the noise in the mark level increases by interference with the optical signal when ASE is present for example).

Even in the optical waveform shaper with a narrow flat mark region FWm, if the optical signal Sin1 without noise is input, the optical signal Sout1 with an open eye (large eye opening) can be obtained. That is, an optical signal with a high S/N ratio is output.

The optical signal Sout2, obtained when the optical signal Sin2 with a little noise is input, also has an open eye (large eye opening). In this case, the S/N ratio is improved by this waveform shaper. However when the optical signal Sin3 with a large amount of noise is input, the eye of the optical signal Sout3 output from the optical waveform shaper is substantially closed (small eye opening). In this case, the signal cannot be regenerated.

FIG. 7 shows signal regeneration in the optical waveform shaper with a wide flat mark region FWm. In other words, the diagram shows signal regeneration in the optical waveform shaper of the first configuration of the present invention. The optical signals Sin1 through Sin3 are the same as the signals explained with reference to FIG. 6.

With a wide flat mark region FWm, not only in the absence of noise or in the presence of a little noise but also in the presence of a large amount of noise, in the marked level (i.e. the optical signal Sin3), the eye aperture of the optical signal Sout3 output from the optical waveform shaper is sufficiently large for regeneration. Therefore, even in the presence of a large amount of noise in the optical input, the S/N ratio of the regenerated signal can be significantly improved.

In order to improve the S/N ratio on the regeneration of an optical input with a large amount of noise, a wide flat mark region FWm is required. In addition, it is desirable that the transfer function has the following characteristics. Here, "FWs" indicates the range of optical input power in which the transfer function is flat or almost flat with respect to the input optical power and the optical output from the optical waveform shaper is in the low-emission state (i.e. space level). "Wtr" indicates the rising range of the transfer function.

FWm/FWs>>1

Wtr<FWm

FIGS. 8A and 8B describe the second and the third configurations of the optical waveform shaper relating to the present invention. The basic constituent elements of the optical waveform shaper of the second and the third configurations are the same as those of the first configuration described in FIG. 3.

In the optical waveform shaper of the second configuration, as described in FIG. 8A, the output from the output port 16b of the interferometer 10 is guided to the input port 21a of the interferometer 20. The output from the output port 26a of the interferometer 20 is used as the output of the optical waveform shaper. That is, interferometer 10 has a negative transfer function, and interferometer 20 has a positive transfer function. The ends of the ports not used for input or for output are anti-reflection terminated by polished obliquely or with an optical isolator.

Figure 9A:
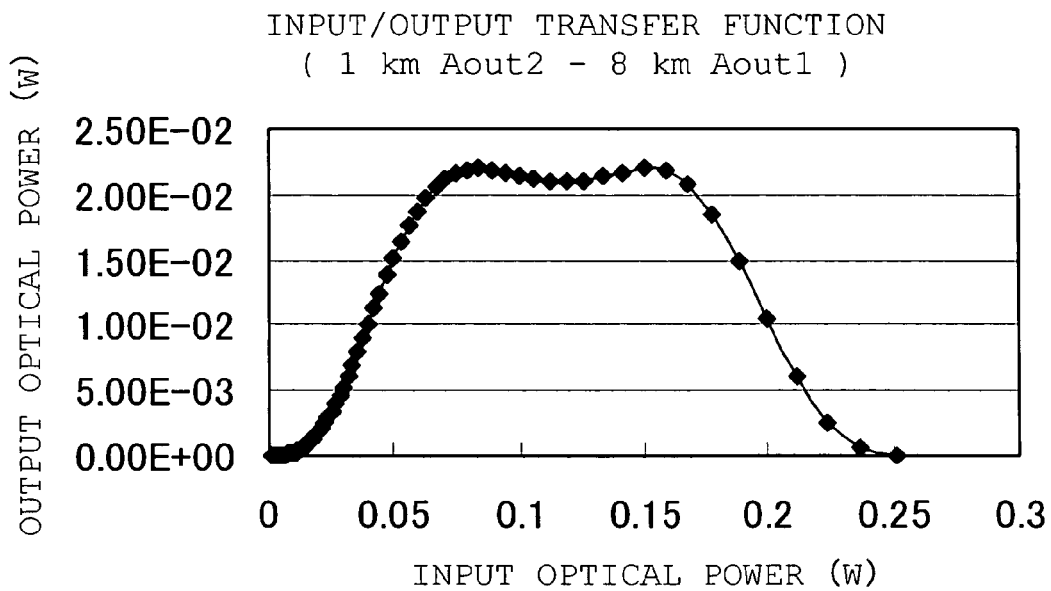
FIG. 9A and FIG. 9B show the transfer functions of the optical waveform shaper of the second and the third configurations respectively.

FIG. 9A shows the input/output transfer function of the optical waveform shaper of the second configuration described in FIG. 8A. As apparent from FIG. 9A, a wide flat mark region FWm can be obtained with the second configuration. Here, the same parameters as the first configuration described above are used, with the exception of the lengths of the fiber configuring the interferometers 10 and 20, which are different.

The length of the highly nonlinear optical fiber 12=the length of the low nonlinearity optical fiber 13=1 km The length of the highly nonlinear optical fiber 22=the length of the low nonlinearity optical fiber 23=8 km In the optical waveform shaper of the third configuration, as described in FIG. 8B, the output from the output port 16b of the interferometer 10 is guided to the input port 21a of the interferometer 20, and the output from the output port 26b of the interferometer 20 is used as the output of the optical waveform shaper. That is, both interferometer 10 and the interferometer 20 have negative transfer functions. The ends of the ports not used for input or for output are anti-reflection terminated by polished obliquely or with an optical isolator.

Figure 9B:
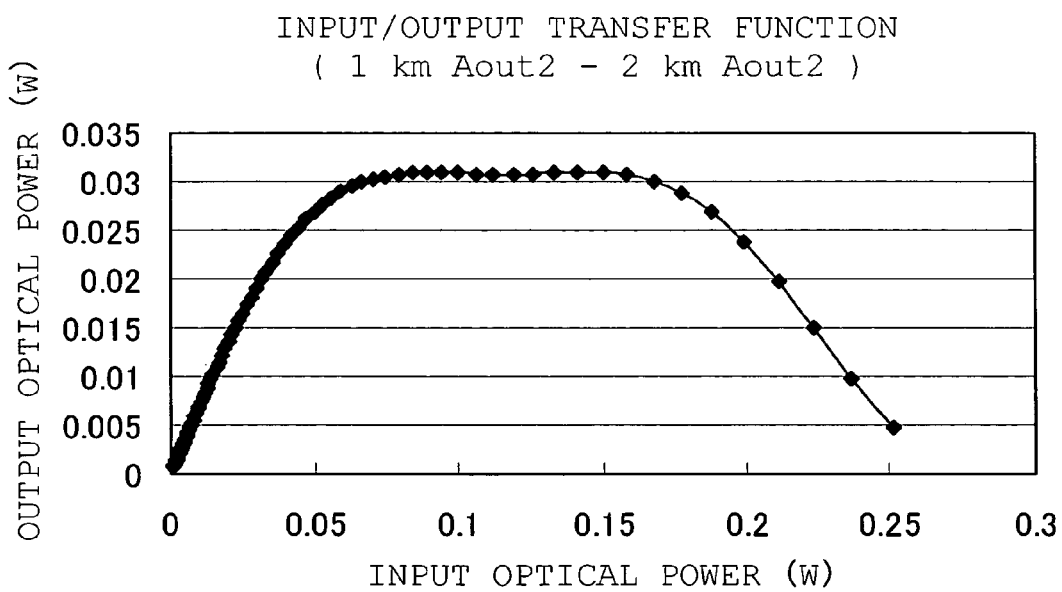

FIG. 9B shows the input/output transfer function of the optical waveform shaper of the third configuration described in FIG. 8B. As apparent in FIG. 9B, the transfer function of the entire optical waveform shaper of the third configuration shows a rapid increase of the output optical power in the neighborhood of zero input power, since no interferometer with a positive transfer function is used. For that reason, the noise reduction effect in the input space level is less than that of the first and the second configurations. However, it can serve as an optical limiter with a wide flat mark region FWm. Here again, the same parameters as the first configuration described above are used with the exception of the lengths of the fiber configuring the interferometers 10 and 20 which are given below.

The length of the highly nonlinear optical fiber 12=the length of the low nonlinearity optical fiber 13=1 km The length of the highly nonlinear optical fiber 22=the length of the low nonlinearity optical fiber 23=2 km As described above, the first through the third configurations have the interferometers connected in series so that at least one interferometer of a plurality of interferometers (two interferometers in the illustrated embodiment) has a negative transfer function. Introduction of such a configuration realizes a wide flat mark region FWm.

Figure 10:
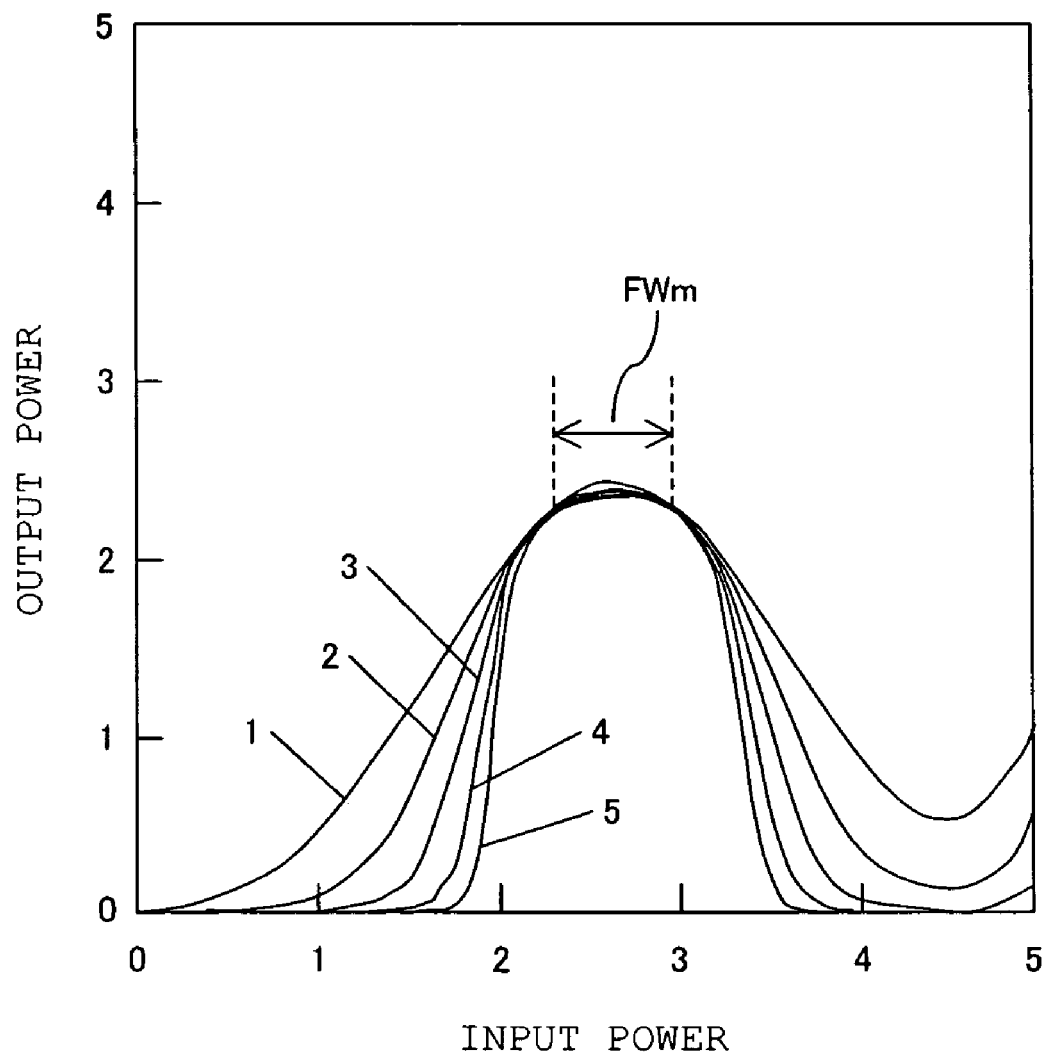
FIG. 10 shows the transfer function of an example of the related art.

In Non-patent Document 1 mentioned above, for example, a configuration, which consists of multiple stages of interconnected interferometers (nonlinear loop mirror), is described. However, each interferometer has a "positive transfer function". As a result the flat mark region FWm does not become wider even as the number of interferometer stages is increased from 1 to 5, see FIG. 10. The applicant of the present case discovered that, in order to obtain a wide flat mark region FWm in an optical waveform shaper based on a plurality of interferometers in a multistage configuration, it is necessary to use at least one interferometer with a negative transfer function.

Figure 11A:
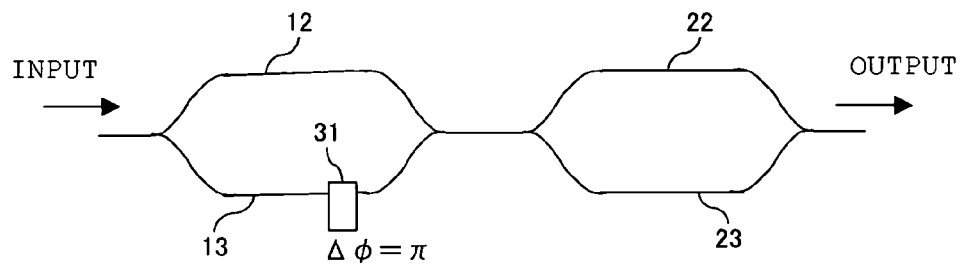
FIG. 11A and FIG. 11B describe the fourth and the fifth configurations of the optical waveform shaper relating to the present invention.

FIG. 11A describes the fourth configuration of the optical waveform shaper relating to the present invention. Each interferometer has Y-shaped splitter waveguides placed at both the input end and the output end, and also comprises one input port and one output port. The first-stage interferometer comprises a phase adjuster 31, which delays the phase of the optical signal propagated through the low nonlinearity optical fiber 13 by $\pi$. By this configuration, the first-stage interferometer provides a positive transfer function as in FIG. 4A, while the second-stage interferometer provides a negative transfer function as in FIG. 4B.

The phase adjuster 31 can be set to adjust the phase of the optical signal propagated through the highly nonlinear optical fiber 12 instead of adjusting the phase of the optical signal propagated through the low nonlinearity optical fiber 13. The phase adjuster 31 can be included in the second-stage interferometer, or in both the first and the second interferometers.

Figure 11B:
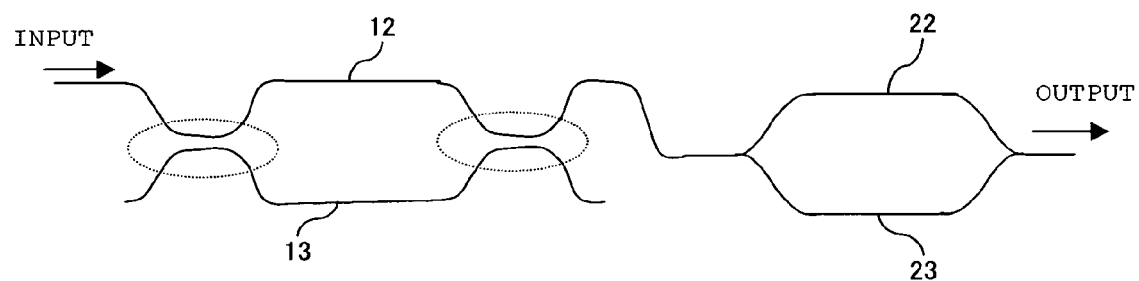

FIG. 11B describes the fifth configuration of the optical waveform shaper relating to the present invention. The optical waveform shaper of the fifth configuration can be realized by combining the first through the third configurations and the fourth configuration. The interferometers of the first through the third configurations and the interferometer of the fourth configuration can be arbitrarily combined. It is only required that at least one of the interferometers has a negative transfer function. The ends of the ports not used for input or for output are anti-reflection terminated by polished obliquely or with an optical isolator.

Figure 12A:
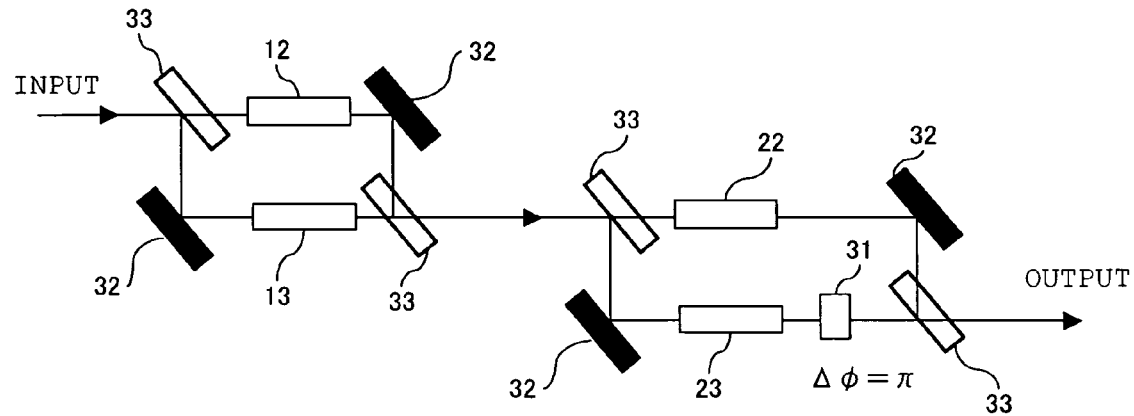
FIG. 12A and FIG. 12B describe the sixth and the seventh configuration of the optical waveform shaper relating to the present invention.
Figure 12B:
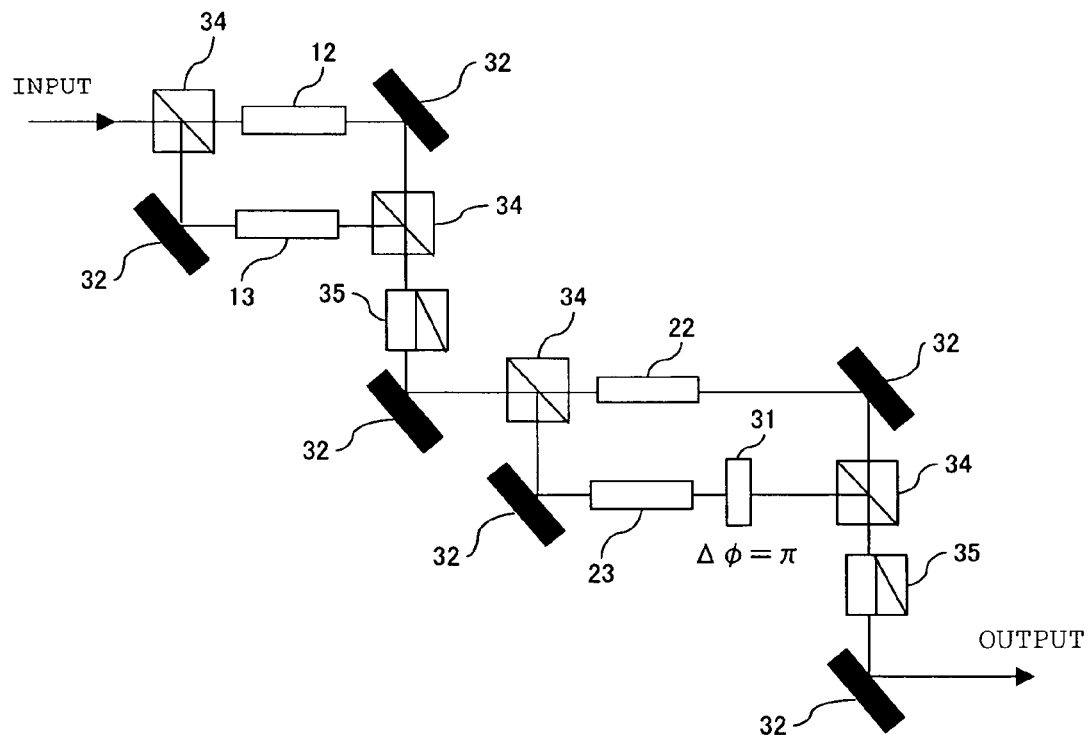

FIG. 12A and FIG. 12B describes the sixth and the seventh configuration of the optical waveform shaper relating to the present invention. The sixth configuration, as shown in FIG. 12A, realizes an optical waveform shaper equivalent of that of the first through the fourth configurations by a spatial beam system utilizing mirror 32 and half mirror 33. The half mirror 33 provided at the input side of each interferometer splits the optical input and guides the split signals to the highly nonlinear optical fibers 12 and 22 and the low nonlinearity optical fibers 13 and 23. The half mirror 33 placed at the output side of each interferometer combines the optical signals propagated by the highly nonlinear optical fiber 12 and 22, and the low nonlinearity optical fibers 13 and 23.

The seventh configuration, as described in FIG. 12B, realizes the optical waveform shaper equivalent of that of the first through the fifth configurations by a spatial beam system utilizing the mirror 32 and the polarization beam splitters (polarizer) 34 and 35. The polarization beam splitter 34 placed at the input side of each interferometer splits the optical input by polarization element and guides the split signals to the highly nonlinear optical fiber 12 and 22 and the low nonlinearity optical fiber 13 and 23. The polarization beam splitter 34 placed at the output side of each interferometer combines the signals propagated by the highly nonlinear optical fibers 12 and 22 and the low nonlinearity optical fibers 13 and 23. In addition, a prescribed orientation is given to the polarization beam splitter 35.

FIGS. 13A and 13B show examples (simulations) of the waveform improvement effect by the optical waveform shaper of the present invention. FIG. 13A and FIG. 13B indicate the input optical waveform and output optical waveform, respectively, of a NRZ-coded signal. In this example, the optical input contains a large amount of noise. The noise level at the mark level is particularly high. However, the optical output regenerated by the optical waveform shaper of the present invention has a large eye opening and its waveform is greatly improved. As a result, the S/N ratio is improved.

The optical waveform shaper of the present invention realizes optical waveform shaping by changing the interference state in the interferometer by utilizing the phase variation caused by self-phase modulation which is proportional to the input optical power. Therefore, it operates well not only with RZ-coded signals but also NRZ-coded signals, which may have consecutive "0"s (space level) or "1"s (mark level) without passing through a transition state, as the interferometer can detect the instantaneous fluctuations of the input optical power.

On the contrary, optical waveform shapers operating on the time derivative of the input optical power cannot sufficiently improve the waveform of NRZ-coded signals, without a transition edge of optical power from "1" to "0" or from "0" to "1" in each bit. For example, a configuration utilizing an optical band pass filter and the frequency change by the time differentiation of the self-phase modulation at the point of change in optical pulse intensity is one type of such optical waveform shaper.

As explained above, the optical waveform shaper of the present invention consists of a plurality of interferometers, and at least one of the interferometers has a negative transfer function. This configuration itself is a new configuration that the prior art does not employ, however the transfer function of each interferometer must be properly controlled, in order to obtain further improved waveform shaping effect.

The transfer function of the interferometer, for example, can be adjusted by adjusting the $\gamma$ value of the optical fiber constituting the interferometer, the length of the optical fiber or the phase shift of the optical signal. In the following description, a method to adjust the phase shift of the optical signal is explained.

Figure 14:
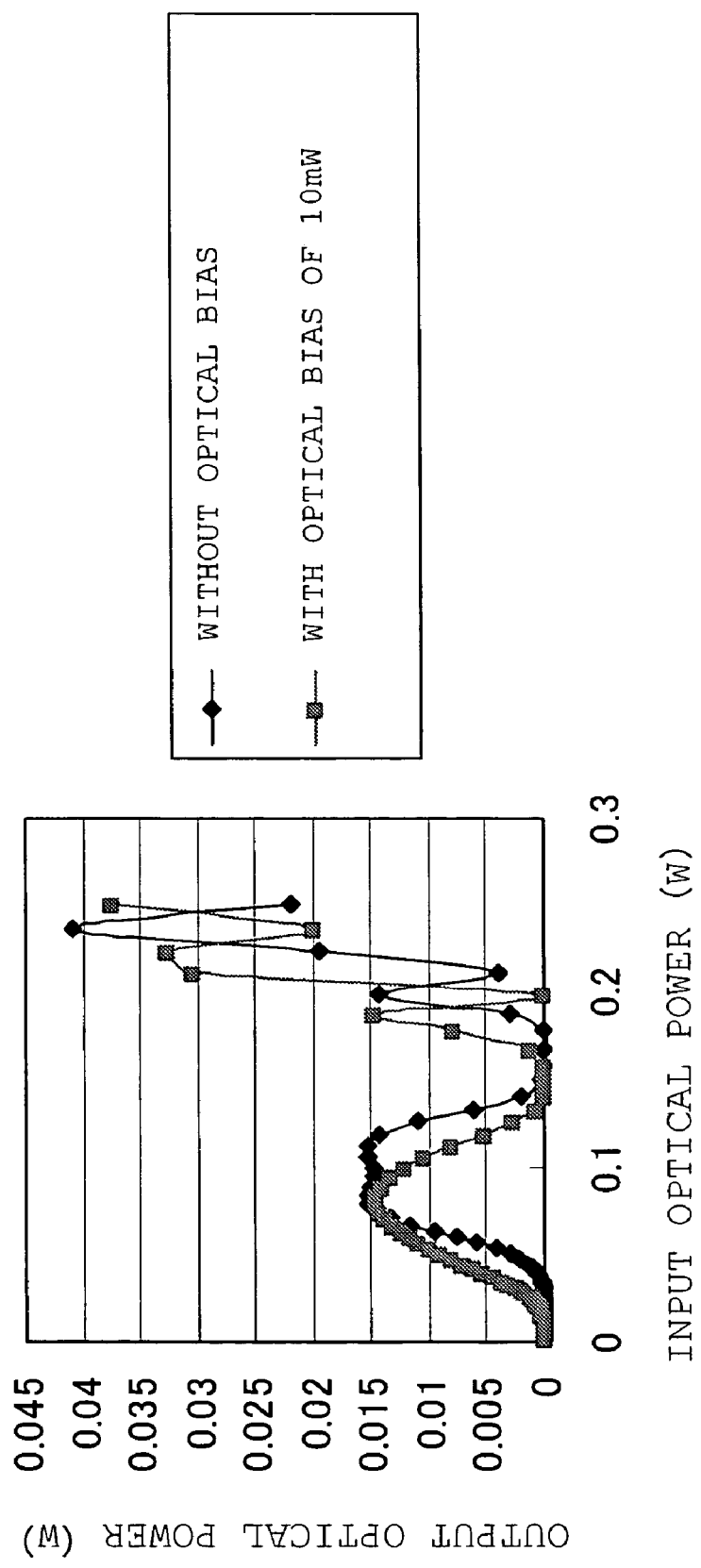
FIG. 14 shows the effect of optical bias on the transfer function of the optical signal.

FIG. 14 shows the effect of optical bias on the transfer function of the optical signal. Here, the optical bias is radiation with a constant power within the waveband of the optical signal, and is input to the interferometer. The wavelength of the optical bias is, however, different from that of the optical signal. The phase of the optical signal is, as shown in FIG. 14, shifted by cross phase modulation caused by the optical bias. The degree of phase shift of the optical signal is adjusted by varying the power and wavelength of the optical bias.

FIG. 15A through FIG. 16E describe configurations for inputting the optical bias to the interferometer. In FIG. 15A through FIG. 16E, the optical source generating the optical bias is omitted.

Figure 15A:
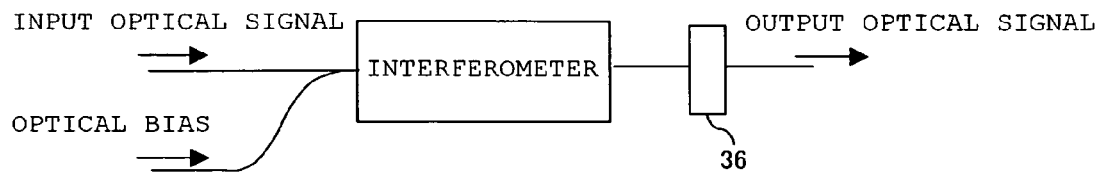
FIG. 15A through FIG. 15D describe the configurations (1 through 4) for providing the optical bias to the interferometer.

In the configuration shown in FIG. 15A, the optical bias is provided from the input side of the interferometer. The optical bias is, then, combined with the optical signal, and provided to the interferometer. The configuration to combine the optical signal with the optical bias is realized by a widely known technique. The optical bias provided from the input side of the interferometer is output with the optical signal. Thus, the optical filter 36 for removing the wavelength element of the optical bias and for passing the wavelength element of the optical signal is comprised at the output side of the interferometer.

Figure 15B:
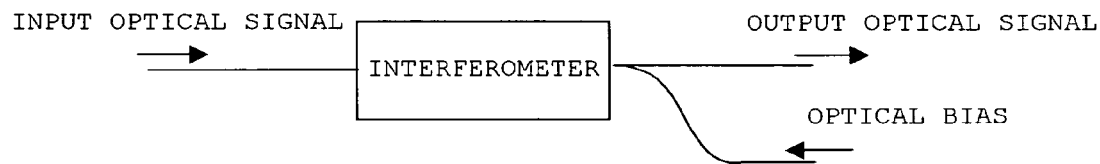

The configuration in FIG. 15B provides the optical bias from the output side of the interferometer. The optical bias, then, is provided to the interferometer utilizing the transmission channel for outputting the optical signal.

Figure 15C:
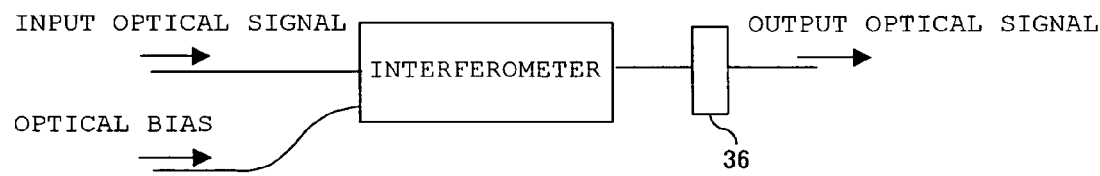
Figure 15D:
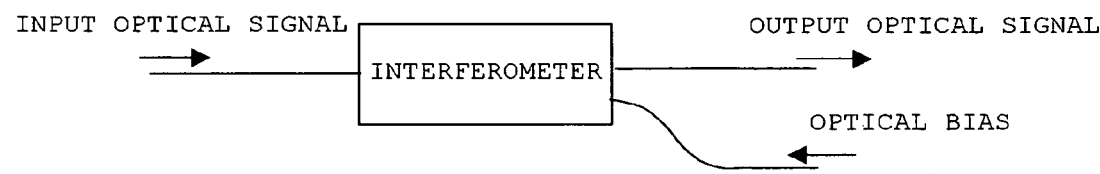

The configurations in FIG. 15C and FIG. 15D are practically equivalent of the configurations shown in FIGS. 15A and 15B, respectively. However the interferometer in these configurations is, like a Mach-Zehnder interferometer, for example, equipped with a plurality of input ports and output ports. The configuration in FIG. 15C provides the optical bias through an unused input port, while the configuration in FIG. 15D provides the optical bias through the output port not used to output the output signal.

FIG. 15A through FIG. 15D provided a description of configurations to provide the optical bias to each interferometer. In the following description, the configurations described are to provide the optical bias to an optical waveform shaper with two interferometers connected in series. The configuration to guide the optical bias to the interferometer can be adopted arbitrarily from the configurations shown in FIG. 15A through 15D.

Figure 16A:
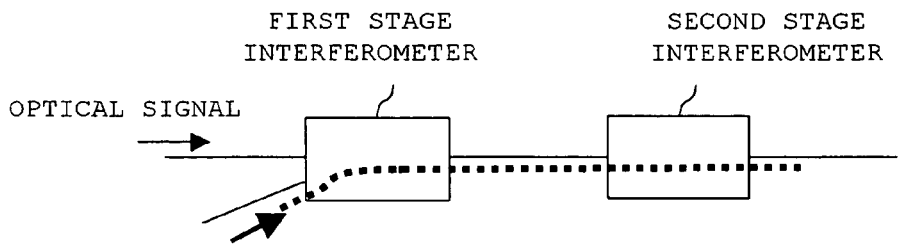
FIG. 16A~FIG. 16E describe the configurations (5 through 9) for providing the optical bias to the interferometer.

The configuration in FIG. 16A provides the optical bias from the input side of the first-stage interferometer. The optical bias passes through the first-stage interferometer, and is provided to the second-stage interferometer with the optical signal. In other words, the optical bias generated by one optical source is provided to both interferometers.

Figure 16B:
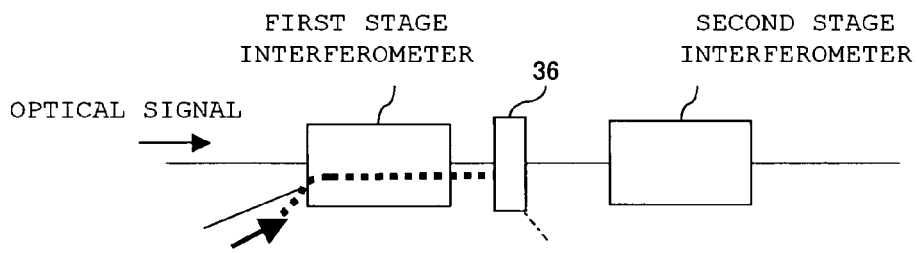

The configuration in FIG. 16B provides the optical bias from the input side of the first-stage interferometer as in the configuration in FIG. 16A. However, an optical filter 36 for blocking the optical bias is equipped between the first-stage interferometer and the second-stage interferometer. In this configuration, therefore, the optical bias is provided only to the first-stage interferometer.

Figure 16C:
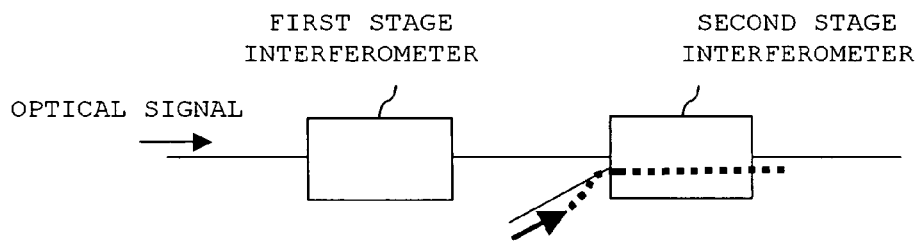

The configuration in FIG. 16C provides the optical bias from the input side of the second-stage interferometer. That is, the optical bias is provided only to the second-stage interferometer in this configuration.

Figure 16D:
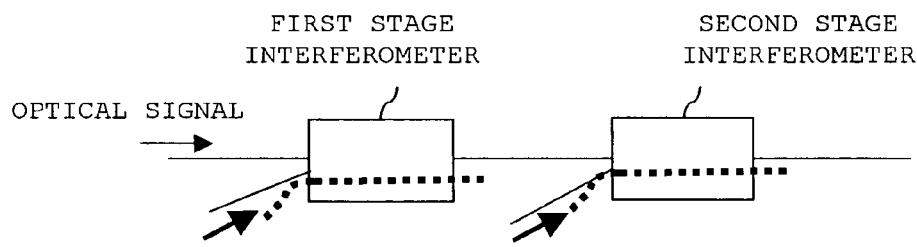

The configuration in FIG. 16D provides the optical bias 1 from the input end of the first-stage interferometer, and the optical bias 2 from the input end of the second-stage interferometer. Different optical biases (optical biases with different wavelengths, for example) can be provided to each interferometer.

Figure 16E:
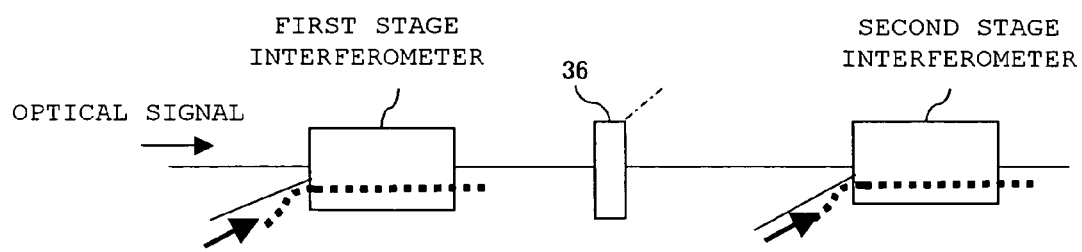

The configuration in FIG. 16E, in addition to the configuration in FIG. 16D, is equipped with an optical filter 36 between the first-stage interferometer and the second-stage interferometer. Consequently, the optical bias 1 will not be provided to the second-stage interferometer in this configuration.

In the following description, an optical waveform shaper utilizing the nonlinear loop mirror as an interferometer is explained with reference to FIG. 17 through FIG. 18B.

Figure 17:
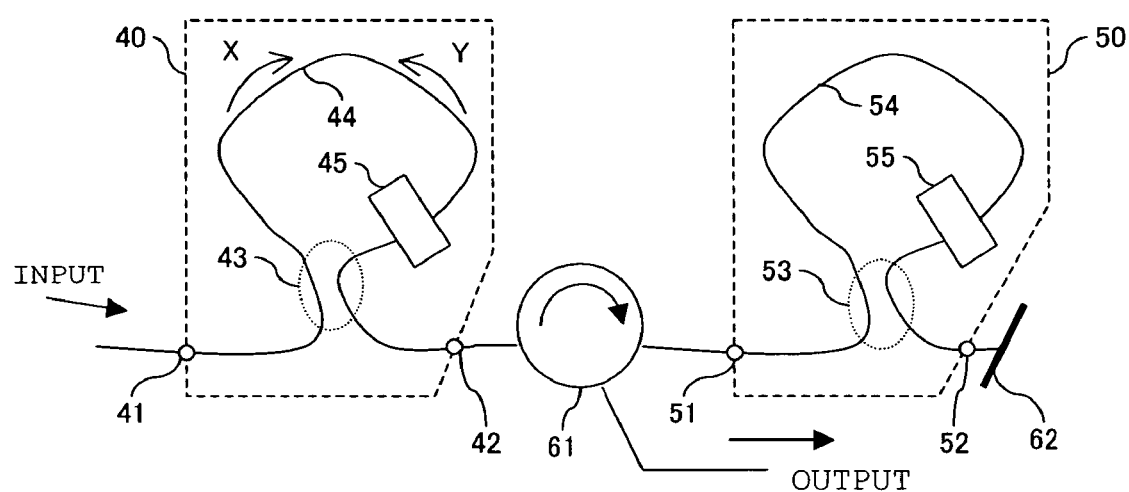
FIG. 17 describes the eighth configuration of the optical waveform shaper relating to the present invention.

FIG. 17 describes the eighth configuration of the optical waveform shaper relating to the present invention. In this description, an optical waveform shaper with two nonlinear loop mirrors connected in series is explained.

The nonlinear loop mirror 40 comprises the input/output ports 41 and 42, the directional coupler 43, the highly nonlinear optical fiber 44, and the optical attenuator 45. The nonlinear loop mirror 50 comprises the input/output ports 51 and 52, the directional coupler 53, the highly nonlinear optical fiber 54, and the optical attenuator 55. The optical circulator 61 is placed between the nonlinear loop mirrors 40 and 50. Additionally, anti-reflecting terminator 62 is connected to the input/output port 52.

The optical signal provided through the input/output port 41 is split by the directional coupler 43. One signal is propagated in the direction indicated by the arrow X in the highly nonlinear optical fiber 44, and the other signal is propagated in the direction indicated by the arrow Y in the highly nonlinear optical fiber 44. In other words, the optical signals output by the directional coupler 43 are counter-propagated in the highly nonlinear optical fiber 44. The optical signals propagated in opposite directions through the highly nonlinear optical fiber 44 are coupled by the directional coupler 43, and are output through the input/output port 42.

The optical signal propagated in the direction indicated by the arrow Y, because it is propagated through the highly nonlinear optical fiber 44 after being attenuated by the optical attenuator 45, has a reduced nonlinear effect compared with the optical signal propagated in the direction indicated by the arrow X. As a result, the optical power of the optical signal coupled by the directional coupler 43 shows the same type of characteristics described in FIG. 4A and FIG. 4B with respect to change in the input optical power, in a similar way to the interferometers 10 and 20 of FIG. 3. That is, the nonlinear loop mirror 40 provides the input/output transfer functions as shown in FIG. 4A and FIG. 4B. In this example, the transfer function of the optical signal output through the input/output port 42 to the optical signal input through the input/output port 41 is the positive transfer function as in FIG. 4A, and the transfer function of the optical signal output through the input/output port 41 is the negative transfer function as in FIG. 4B. That is, the nonlinear loop mirror 40 in this optical waveform shaper uses the positive transfer function.

The optical signal output through the input/output port 42 of the nonlinear loop mirror 40 is guided to the input/output port 51 of the nonlinear loop mirror 50 via the optical circulator 61.

The configuration and the operation of the nonlinear loop mirror 50 are basically the same as those of the nonlinear loop mirror 40. However in the nonlinear loop mirror 50, the output from the input/output port 51 is used as the output optical signal from the nonlinear loop mirror 50. Also in the nonlinear loop mirror 50, the transfer function of the optical signal output through the input/output port 52 to the optical signal input through the input/output port 51 is a positive transfer function, and the transfer function of the optical signal output through the input/output port 51 is a negative transfer function. In other words, the nonlinear loop mirror 50 of the optical waveform shaper uses a negative transfer function.

The waveform regenerated optical signal output through the input/output port 51 of the nonlinear loop mirror 50 is outputted via the optical circulator 61.

In summary, in the optical waveform shaper of the eighth configuration described in FIG. 17, the nonlinear loop mirror 40 has a positive transfer function, and the nonlinear loop mirror 50 has a negative transfer function. The optical waveform shaper of the eighth configuration, thus, has a configuration equivalent to the optical waveform shaper described in FIG. 3.

In the configuration of FIG. 17, the optical attenuators 45 and 55 are chosen so that the nonlinearity of the signal propagating in the direction indicated by the arrow X and the nonlinearity of the signal propagating in the direction indicated by the arrow Y in the nonlinear optical fiber 44 are different. However, the embodiment is not limited to this approach. A configuration in which the splitting ratio of the directional couplers 43 and 53 is made asymmetric, or a configuration in which the optical amplifier or a wavelength dispersion element are used instead of the optical attenuator, can be employed.

There are two channels in the highly nonlinear optical fiber, which counter-propagate the optical signals in the nonlinear loop mirror. Consequently, it is possible that crosstalk is caused by cross phase modulation between the channels. Thus, it is necessary to reduce the crosstalk to a satisfactory extent.

Figure 18A:
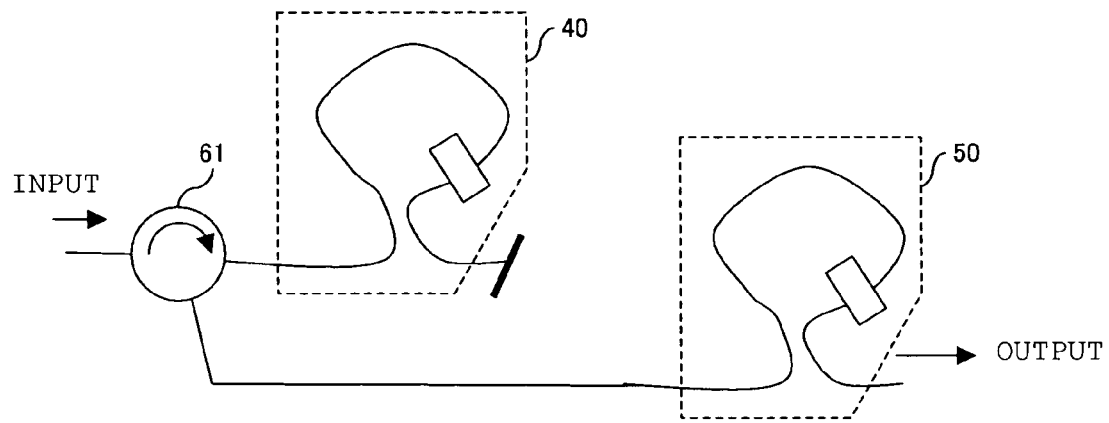
FIGS. 18A and 18B describe the ninth and the tenth configurations of the optical waveform shaper relating to the present invention.

FIG. 18A describes the ninth configuration of the optical waveform shaper relating to the present invention. In the optical waveform shaper of the ninth configuration, the nonlinear loop mirrors 40 and 50 are connected so that the negative transfer function of the nonlinear loop mirror 40 is used, and the positive transfer function of the nonlinear loop mirror 50 is used. By so doing, the optical waveform shaper, which is practically equivalent to the configuration shown in FIG. 8A, can be realized.

Figure 18B:
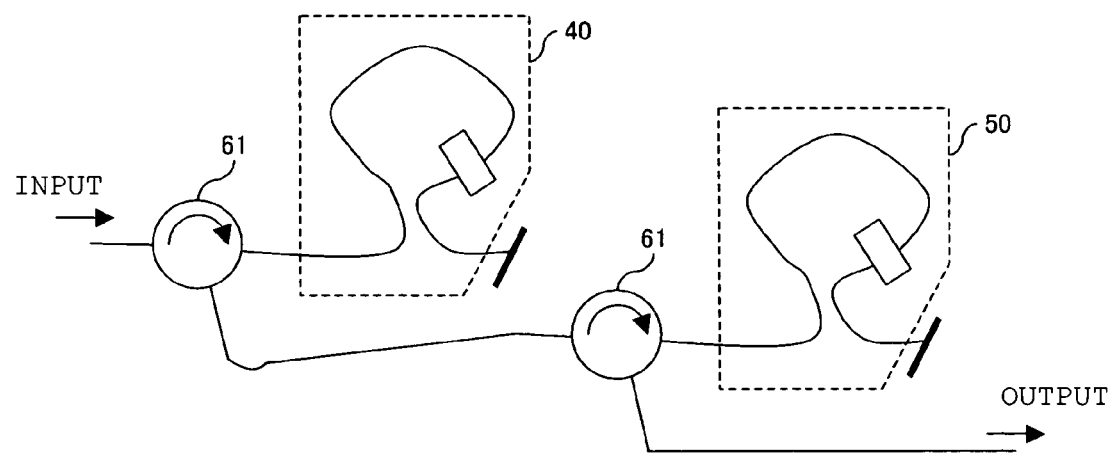

FIG. 18B describes the tenth configuration of the optical waveform shaper relating to the present invention. In the optical waveform shaper of the tenth configuration, the nonlinear loop mirrors 40 and 50 are connected so that nonlinear loop mirror 40 has a negative transfer function, and nonlinear loop mirror 50 also has a negative transfer function. By so doing, an optical waveform shaper, which is practically equivalent to the configuration shown in FIG. 8B, can be realized.

Figure 19:
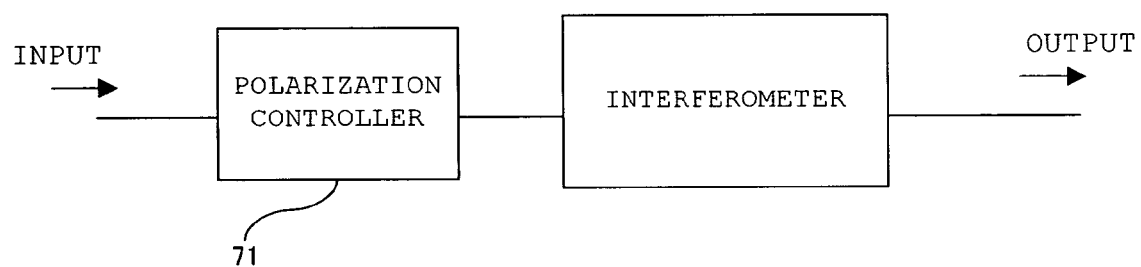
FIG. 19 shows a configuration comprising a polarization controller in the stage before the interferometer.

When the optical waveform shapers of the first through the tenth configurations have long propagation channels in the interferometer, it is sometimes difficult to match each polarization state of the signals propagated through a pair of channels (two virtual channels formed in a propagation path in the nonlinear loop mirror). In order to solve this problem, as described in FIG. 19, the polarization controller 71 is placed before the interferometer, and the optical signal can be provided to the interferometer after a certain polarization state has been obtained. It is preferable to maintain the polarization state in the optical system which configures the interferometer. Such a configuration can drastically reduce the influence of external oscillation and temperature change on the interferometer.

Figure 20:
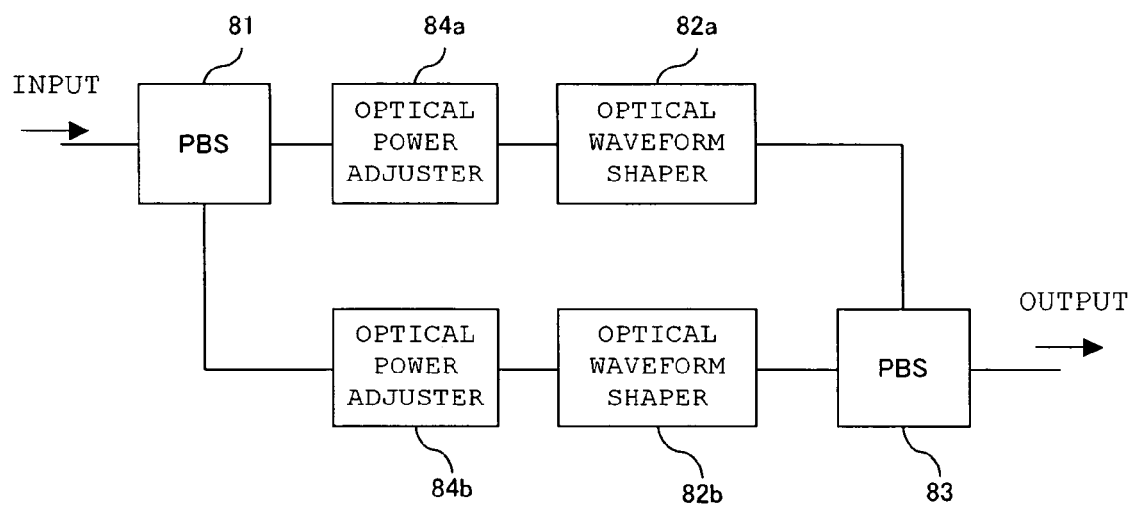
FIG. 20 describes an embodiment of the optical waveform shaper comprising a function to reduce the polarization dependency.

Alternatively, by adopting the configuration of FIG. 20, the polarization dependency can be reduced to a certain extent without controlling the polarization of the input optical signal. Specifically, the polarization element device 81, such as a polarization beam splitter, is installed and splits the optical signal into a mutually perpendicular pair of polarization elements (a mutually perpendicular pair of linearly-polarized elements, for example). A pair of optical waveform shapers 82a and 82b is configured. Here, any of the first through the ninth configurations described above can be used as the optical waveform shapers 82a and 82b. The waveform shaping can be performed on each polarization element separately using the optical waveform shapers 82a and 82b, and the polarized waves are combined by the polarization element 83.

The ratio of the optical power of the pair of polarization elements obtained by the polarization element 81 depends on the polarization state of the optical input. It is, therefore, desirable that the optical power ratio is properly adjusted by placing the optical power adjusters 84a and 84b one stage before the optical waveform shapers 82a and 82b. Here, the optical power adjusters 84a and 84b are optical amplifiers or optical attenuators, for example. When polarization maintaining fiber is used as a propagation path constituting the interferometer, the pair of polarization elements obtained by the polarization element 81 should be aligned according to the axis of refractive index anisotropy of the polarization maintaining fiber.

Figure 21:
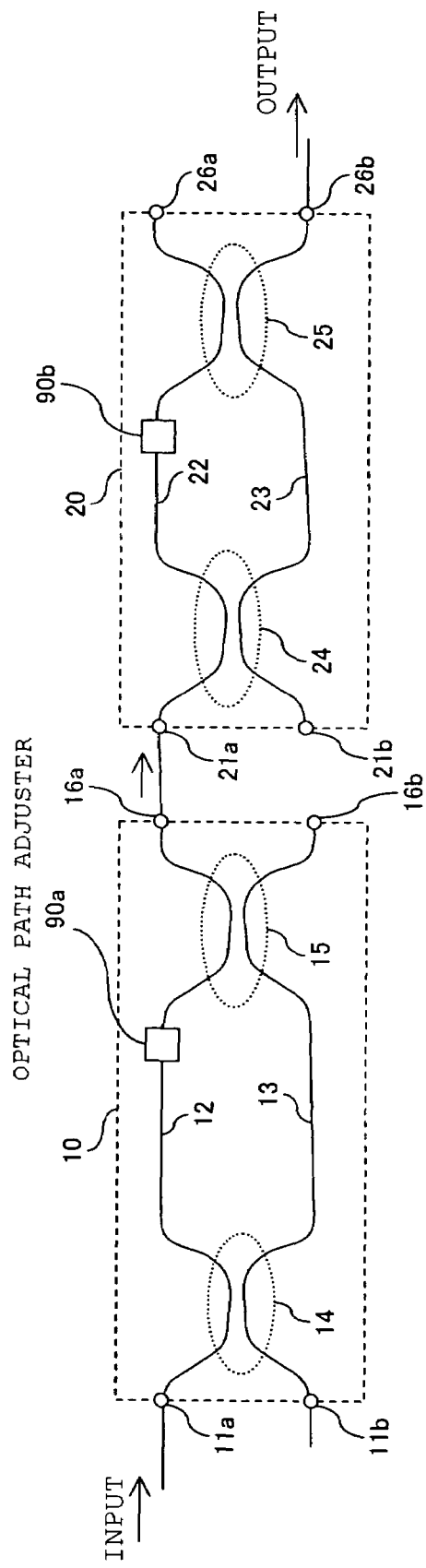
FIG. 21 shows the basic configuration of the optical waveform shaper with a function dynamically adjusting the characteristics of the interferometer.

FIG. 21 illustrates a basic configuration of the optical waveform shaper comprising a dynamic adjustment function of the interferometer characteristics. If the two propagation paths in the interferometer are physically divided (or configured with two optical fibers, for example) the interference condition depends on the local temperature. Change in the interference condition would cause degradation in the characteristics of the optical waveform shaper. In order to prevent such degradation, the optical waveform shaper of the illustrated embodiment comprises the optical path length adjusters 90a and 90b for fine-adjusting of the optical path length of at least one of the two propagation paths in each interferometer.

The optical path length adjusters 90a and 90b fine-adjust the optical path length by providing, for example, the following functions.

Figure 22:
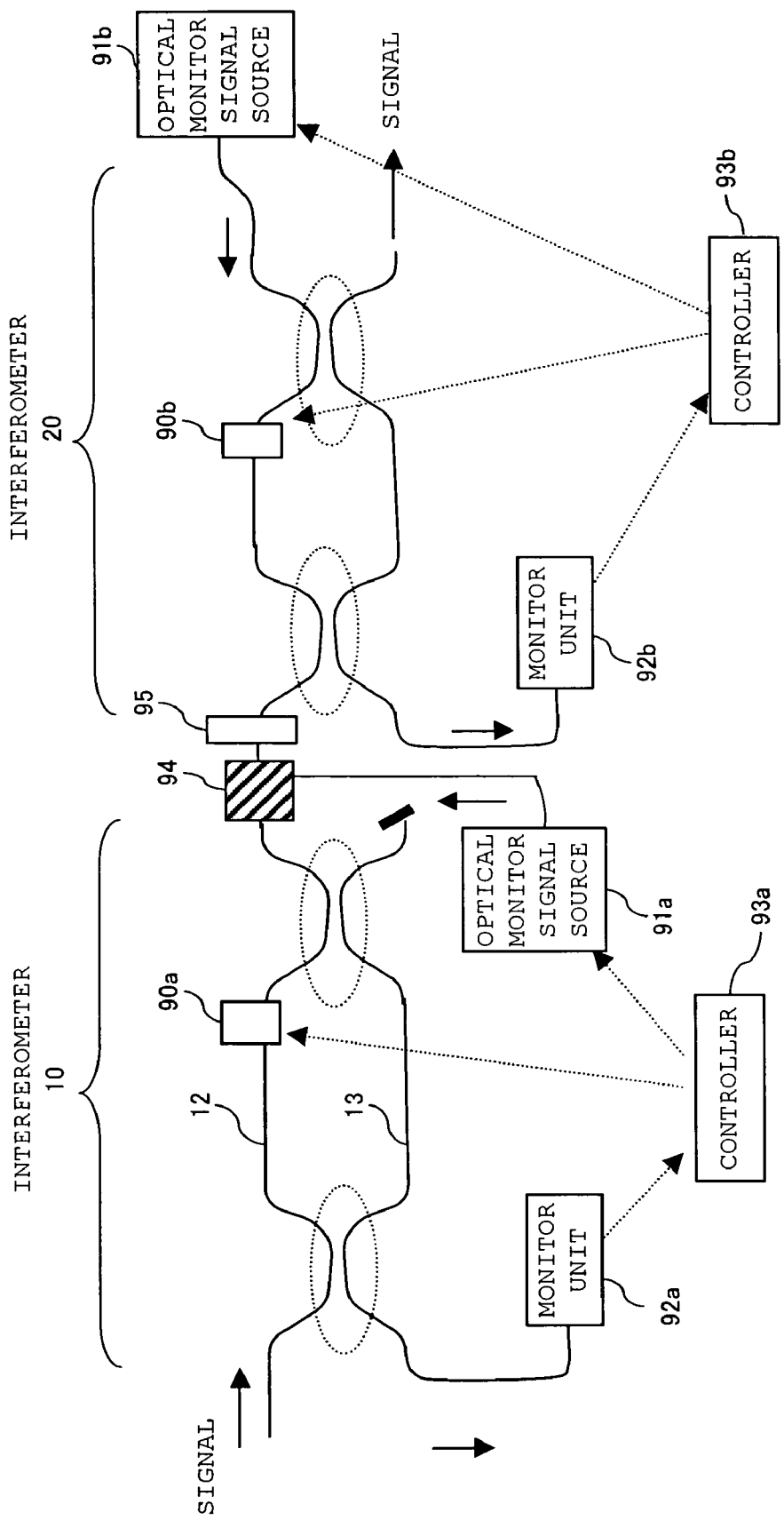
FIG. 22 describes an embodiment of the optical waveform shaper with a function to dynamically adjust the characteristics of the interferometer.

(1) A function for changing the refractive index by changing the temperature of the optical waveguide in the interferometer
(2) A function for expanding the optical waveguide by changing the temperature of the optical waveguide in the interferometer
(3) A function for extending the optical waveguide by applying stress along the guiding direction of the optical waveguide
(4) A function for changing the refractive index of the optical waveguide by changing the carrier density
(5) A function for changing the refractive index of the material consisting of the optical waveguide by applying an electric field
(6) A function for changing the optical path length using a spatial beam optical system FIG. 22 describes an embodiment of the optical waveform shaper comprising a dynamic interferometer adjustment function. The embodiment is based on the optical waveform shaper of the first configuration described in FIG. 3. Each of the interferometers 10 and 20 has optical path length adjusters 90a and 90b, respectively.

Optical monitor signal sources 91a and 91b generate the optical monitor signal to be input to the interferometers 10 and 20, respectively. The optical monitor signal includes a plurality of different wavelength components out of the wavelength band of the optical signal. The optical monitor signal is not modulated in the frequency band of the modulation band of the optical signal, and its optical power is low compared with the optical signal. The optical monitor signal sources 91a and 91b are realized by LEDs or multimode laser diodes.

The optical monitor signals are input from the output end of the interferometers 10 and 20. The optical monitor signal generated by the optical monitor signal source 91a is supplied to the interferometer 10 utilizing the optical device 94. The optical device 94 guides the optical signal output from the interferometer 10 to the interferometer 20, and also guides the optical monitor signal generated by the optical monitor signal source 91a to the interferometer 10. The optical device 94 may be realized using a band reject optical filter, for example. The optical monitor signal generated by the optical monitor signal source 91b is supplied to the interferometer 20 through an unused output port. The optical filter 95 is provided in order to prevent the optical monitor signal generated by the optical monitor signal source 91b from propagating to the interferometer 10.

The monitor units 92a and 92b detect the optical monitor signal from the optical monitor signal sources 91a and 91b, respectively. The monitor units 92a and 92b can be realized by photoelectric transducers such as photo-diodes.

The controllers 93a and 93b control the operation or the characteristics of the optical path length adjusters 90a and 90b so that the optical monitor signal elements within the wavelength band are unchanged from the initial setting conditions, with reference to the outputs of the monitor units 92a and 92b. The optical path length adjusters 90a and 90b adjust the optical path length of the propagation path using any function of the above listed (1) through (6) under the control of the controllers 93a and 93b respectively.

The optical power of the optical monitor signal is sufficiently smaller than that of the optical signal. For that reason, in the interferometer 10, for example, the optical monitor signal cases little nonlinearity when propagated in the highly nonlinear optical fiber 12 and substantially no nonlinearity in the low nonlinearity optical fiber 13. The optical path lengths of the two propagation paths consisting the interferometer 10 (i.e. the highly nonlinear optical fiber 12 and the low nonlinearity optical fiber 13) initially have the same setting, the average of the optical power of the optical monitor signal detected by the monitor unit 92a should be a constant average value, if the average optical signal power is constant and the optical path length of the interferometer does not change. Then, if the optical path length adjusters 90a and 90b are controlled so that the detected average optical power of the optical monitor signal within the wavelength band of the optical monitor signal equals to that of the initial average optical power, each of the interferometers 10 and 20, the difference in the optical path lengths of the two propagation paths consisting each interferometer 10 and 20 can be maintained at zero (or a half-wave length). By so doing, degradation of the waveform shaping effect can be avoided.

The optical monitor signal can be a single wavelength source. However, when the difference in optical path lengths of the two propagation paths constituting the interferometer is an integral multiple of the wavelength, it cannot be determined whether the difference in optical path lengths is zero (or a half-wave length). For that reason, it is preferable that the optical monitor signal has a plurality of wavelength elements different from each other.

The waveform improvement effect of the optical waveform shaper, which regenerates waveforms using the interferometer, depends on the characteristics of the transfer function of each interferometer, the peak value of the optical power of the input signal and the noise width of the input signal. It is, therefore, necessary to design the optical waveform shaper, considering these independent elements.

Figure 23:
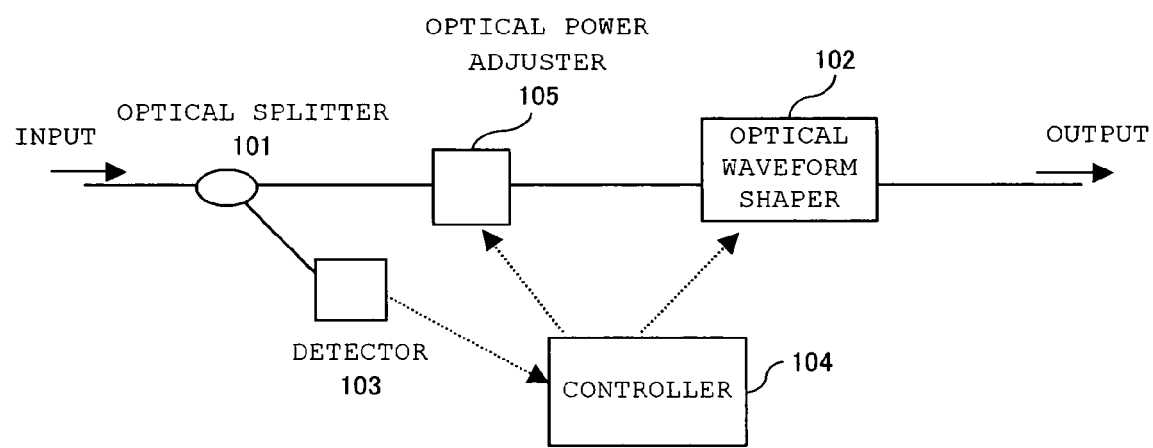
FIG. 23 describes a configuration of the optical waveform shaper with a function adjusting the characteristics according to the optical power and noise of the input signal.

FIG. 23 describes a configuration of the optical waveform shaper comprising a function for adjusting the characteristics depending on the noise level and the optical power of the input signal. The optical splitter 101 splits the input optical signal. A large part of the optical signal output by the optical splitter 101 is guided to the optical waveform shaper 102, the rest of the output optical signal is input to the detector 103. The optical waveform shaper 102, for example, is an optical waveform shaper of any of the configurations of the first through the tenth, mentioned above. However, the optical waveform shaper 102 has a function for adjusting the transfer function based on the optical signal.

The detector 103 detects the optical power (or the peak power) of the optical signal. The controller 104 controls the optical power adjuster 105 based on the detection result of the detector 103. Here, the optical power adjuster 105 is an optical amplifier or an optical attenuator, and it adjusts the optical power of the optical signal. The controller 104 can control the transfer function of the optical waveform shaper 102 based on the detection result of the detector 103. To be more specific, it adjusts the transfer function of at least one of the interferometers in the optical waveform shaper 102.

The detector 103 can detect or estimate the noise level of the optical signal instead of detecting the optical power of the signal. In such a case, the controller 104 controls the optical power adjuster 105 and/or the optical waveform shaper 102 based on the detected or estimated noise level. In addition, the noise level can be the expected value based on simulations.

As explained above, the optical waveform shaper of the present invention comprises a plurality of interferometers, and comprises a configuration in which at least one of the interferometers has a "negative transfer function". In order to achieve better waveform shaping effect, it is favorable to properly adjust the transfer function of the entire optical waveform shaper, obtained by combining the transfer functions of each interferometer.

Favorable synthesized transfer functions can be obtained by the following procedures, for example.

(1) Connecting an interferometer with a positive transfer function and that with a negative transfer function in series. By so doing, the gradient of the synthesized transfer function in the neighborhood of zero input optical power is reduced. That is, a certain width of the flat space region FWs, shown in FIG. 7, can be secured. As a result, even though the input signal in the spaced region has noise, the signal can be regenerated in such a way that the output signal becomes "0 (i.e. space state)".

(2) Shifting the peak position of the transfer function of each interferometer by changing the magnitude of the nonlinear effects of each interferometer. The peak position of the transfer function of each interferometer is adjusted so that the flat mark region FWm of the synthesized transfer function covers a wide range.

(3) Finding a combination, which provides a favorable synthesized transfer function by fine-adjusting the parameters (the length and the y value of the optical fiber consisting the interferometer) determining the nonlinear effects of each interferometer after obtaining a function close to a favorable synthesized transfer function by the above procedure (2).

Next, the following description illustrates an embodiment relating to the above procedures for obtaining a favorable synthesized transfer function. In the first embodiment, it is explained that an arbitrary combination does not always yield an optical waveform shaper with favorable characteristics. In the second embodiment, the conditions to obtain an optical waveform shaper with favorable characteristics are illustrated.

Embodiment 1

The configuration of the optical waveform shaper is the first configuration shown in FIG. 3 or the second configuration shown in FIG. 8A. Specifically, the optical waveform shaper adopts the configuration in which the interferometers 10 and 20 are connected in series, and one of the interferometers has a positive transfer function and the other has a negative transfer function. Also, the following parameters are given.

The γ value of the highly nonlinear optical fibers 12 and 22: 25.0 (1/(W·km))

The wavelength dispersion of the highly nonlinear optical fibers 12 and 22: −0.5 (ps/nm/km)

The wavelength dispersion slope of the highly nonlinear optical fibers 12 and 22: 0.08 (ps/nm^2/km)

The γ value of the low nonlinearity optical fibers 13 and 23: 1.3 (1/(W·km))

The wavelength dispersion of the low nonlinearity optical fibers 13 and 23: −0.5 (ps/nm/km)

The wavelength dispersion slope of the low nonlinearity optical fibers 13 and 23: 0.08 (ps/nm^2/km)

Embodiment 1-1

Configuration: The first configuration of FIG. 3
The fiber length in the interferometer 10: 1.0 km
The fiber length in the interferometer 20: 1.0~10.0 km
Synthesized transfer function: see FIG. 24

Figure 24:
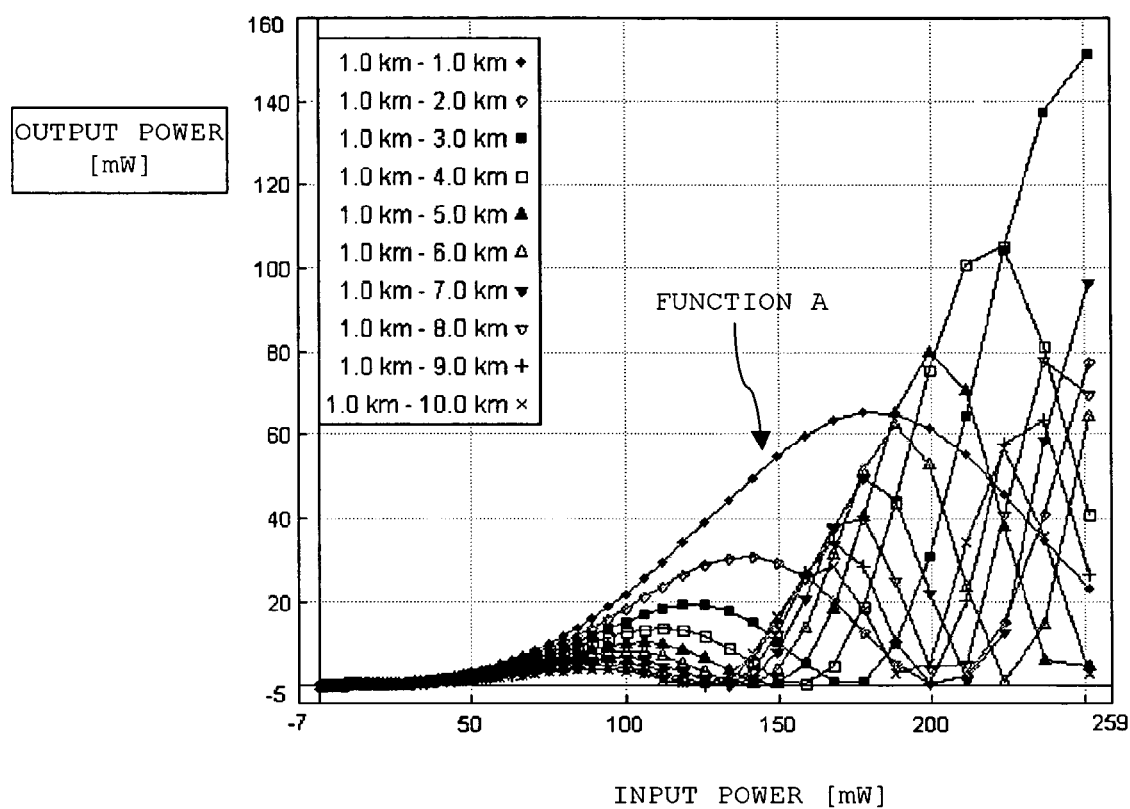
FIG. 24 shows the transfer function of the embodiment 1-1.

In FIG. 24, a function A represents the transfer function when the fiber length in the interferometer 20 is 1 km. Although the function A seems to have the best characteristics, it has substantially the same transfer function as that of one interferometer (the interferometer 10 in this case). That is to say, it is shown that connecting the interferometer 20 in the subsequent stage does not improve the synthesized transfer function when the fiber length of the interferometer 10 is short.

Here, a favorable transfer function refers to a function, which meets the following requirements, as explained with reference to FIG. 7.

(1) The width of the flat space region FWs is not zero, but has a certain width. When this requirement is satisfied, "0" is obtained as the output signal even though the input signal "0 (i.e. space level)" is noisy.

(2) A wide flat mark region FWm is obtained. When this requirement is satisfied, "1" is obtained as the output signal even though the input signal "1 (i.e. mark level)" has a large amount of noise due to ASE etc.

Embodiment 1-2

Figure 25:
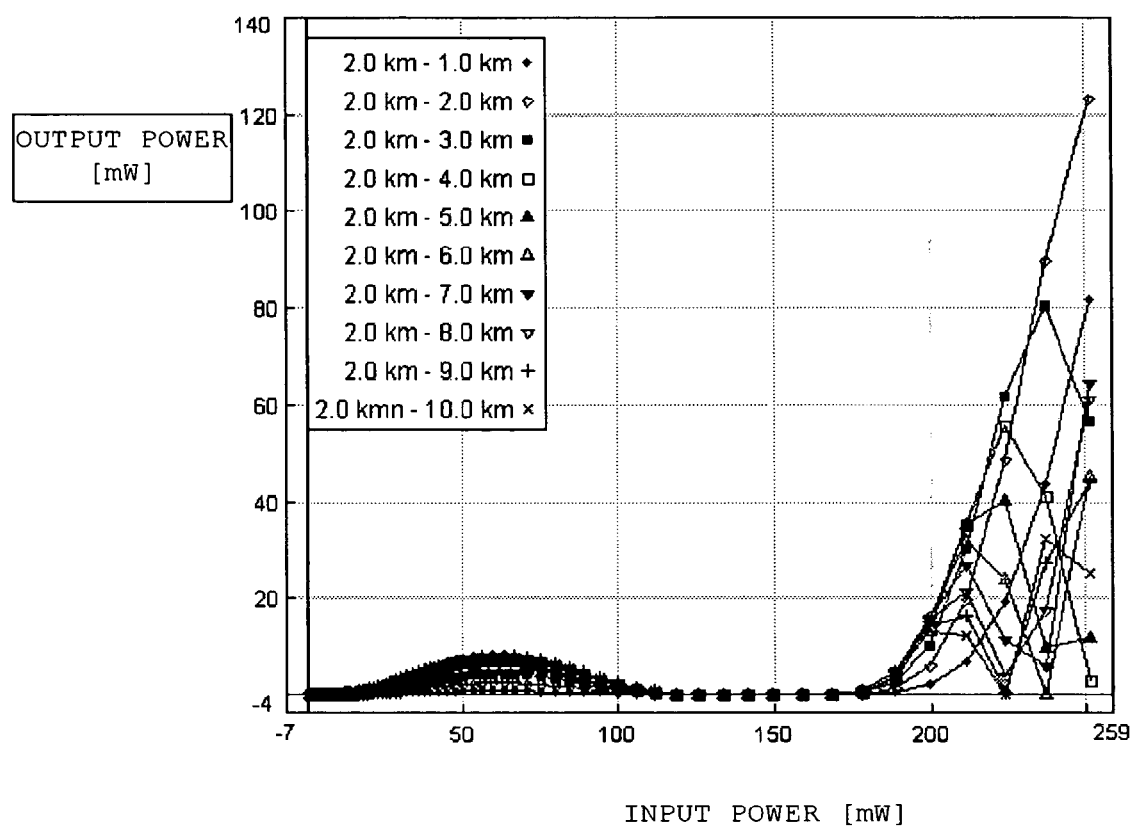
FIG. 25 shows the transfer function of the embodiment 1-2.

Configuration: The second configuration of FIG. 8A
The fiber length in the interferometer 10: 2.0 km
The fiber length in the interferometer 20: 1.0~10.0 km
Synthesized transfer function: see FIG. 25

In this embodiment, a favorable synthesized transfer function cannot be obtained no matter how long the fiber length of the interferometer 20 is. A wide flat mark region FWm will not be obtained.

Embodiment 1-3

Figure 26:
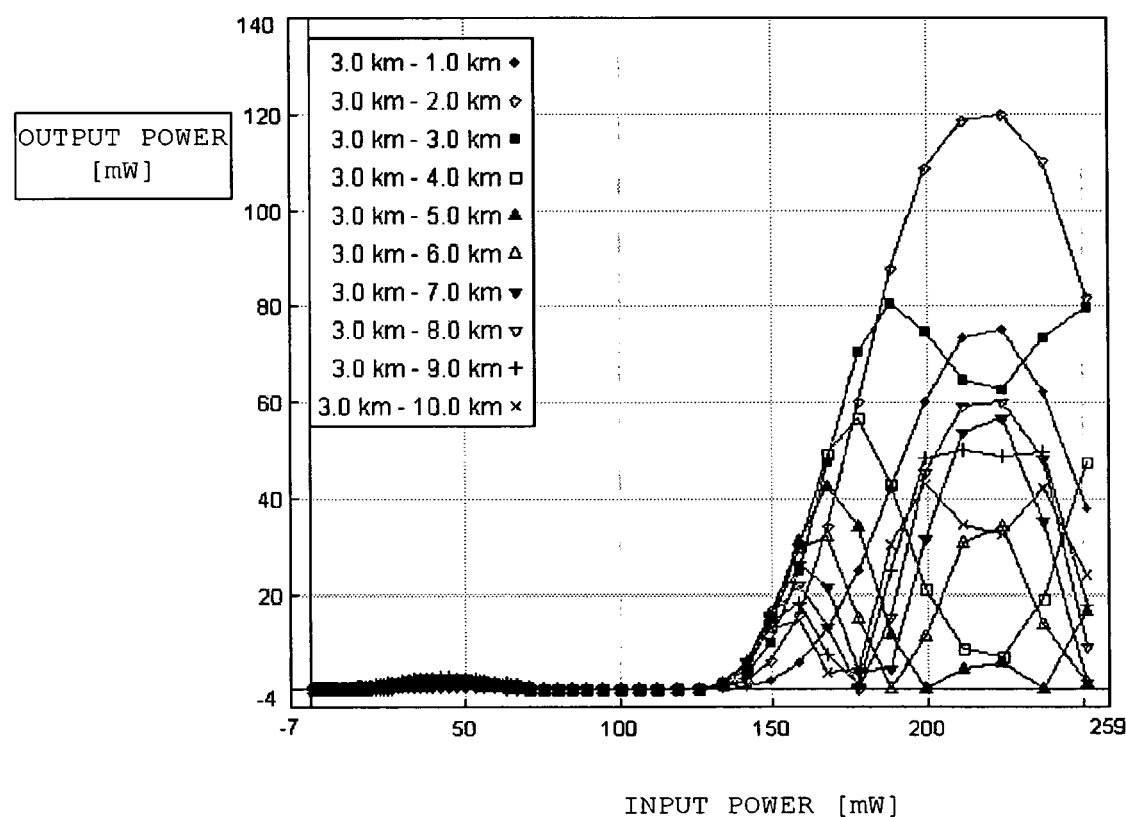
FIG. 26 shows the transfer function of the embodiment 1-3.

Configuration: The second configuration of FIG. 8A
The fiber length in the interferometer 10: 3.0 km
The fiber length in the interferometer 20: 1.0~10.0 km
Synthesized transfer function: see FIG. 26

In this embodiment, a certain level of waveform improvement effect can be noted compared with the case in which the interferometer 10 or 20 is used alone. However, the width of the flat region of the synthesized transfer function in the mark region with respect to the input optical power is narrower than the width of the flat region of the synthesized transfer function in the space region. To be more specific, the marked flat region width is only about 40 mW (200~240 mW) even in the best case (in this case, the fiber length of the interferometer 20 is 9 km), whereas the width of the spaced flat region is about 130 mW (0~30 mW). The noise of the input signal is, generally, dominated by ASE, and there is a large amount of noise in the mark level compared with in the space level. It is, thus, desirable to have a wide flat mark region rather than a wide flat space region width.

Embodiment 1-4

Configuration: The first configuration of FIG. 3
The fiber length of the interferometer 10: 3.0 km
The fiber length of the interferometer 20: 1.0~10.0 km
Synthesized transfer function: see FIG. 27

Figure 27:
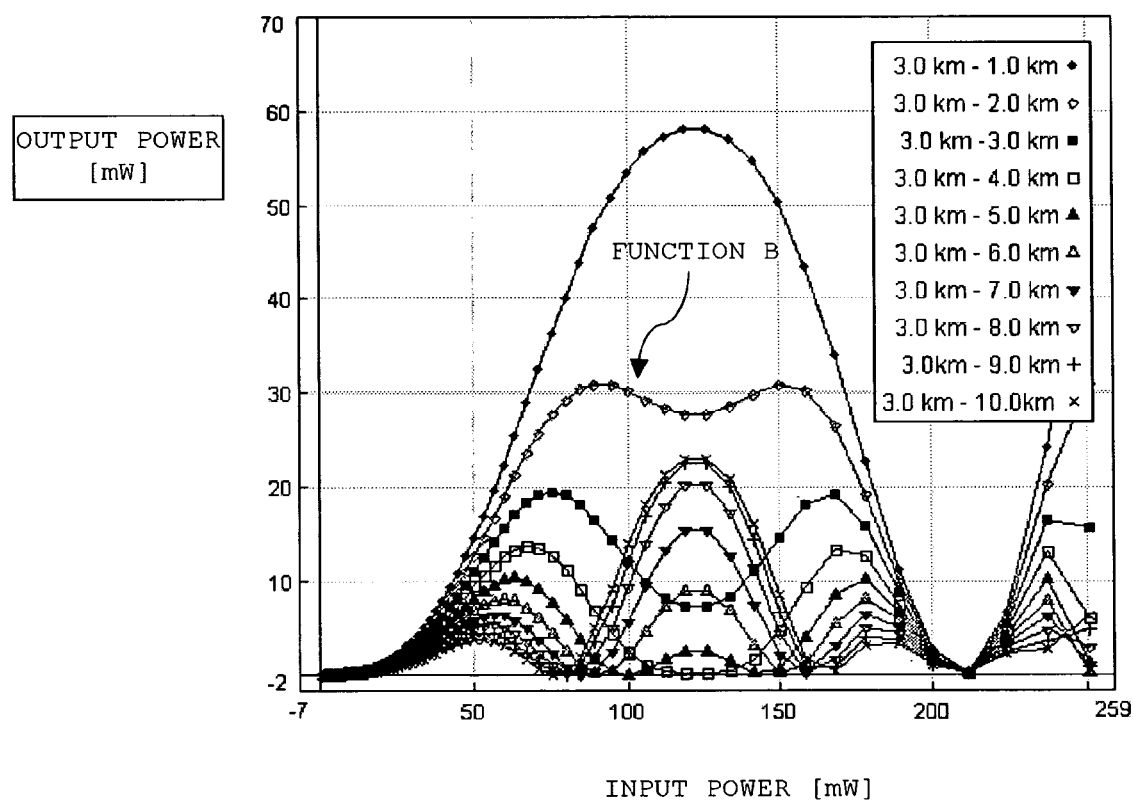
FIG. 27 shows the transfer function of the embodiment 1-4.

In this embodiment, a favorable synthesized transfer function can be obtained when the fiber length of the interferometer 20 is 2 km. In FIG. 27, the function B represents the transfer function when the fiber length of the interferometer 20 is 2 km. In this case, the flat mark region width is about 80 mW (80~160 mW), whereas the width of the flat space region is about 20 mW (0~20 mW).

Part of the calculation to obtain a favorable synthesized transfer function is shown above however derivation of a synthesized transfer function with a prominent waveform shaping effect is not necessarily easy.

Embodiment 2

The configuration of the optical waveform shaper is the first configuration shown in FIG. 3, the second configuration shown in FIG. 8A or the third configuration shown in FIG. 8B. That is, the optical waveform shaper has a configuration, which has the interferometers 10 and 20 connected, at least one of the interferometers has a negative transfer function, and the interferometers 10 and 20 are both Mach-Zehnder interferometers. Here, the characteristics of the interferometers 10 and 20 are expressed in the following equation.

When the first-stage interferometer has a positive transfer function (i.e. the optical signal is output from the output terminal 16a of the interferometer 10), the transfer function is expressed by the following equation (1).

$$P1s = T1 \times Tm \times P0 \times (\sin[a1 \times P0/2])^2 \tag{1}$$

P1s: the output optical power of the output port 16a of the interferometer 10

P0: the input optical power of the interferometer 10 a1: the difference in phase shift between two paths (the highly nonlinear optical fiber 12 and the low nonlinearity optical fiber 13) consisting the interferometer 10, proportional to unit optical power T1: the transmissivity considering the gain and the loss of the interferometer 10 but excluding interference Tm: the transmissivity considering the gain between the interferometers 10 and 20.

When the first-stage interferometer has a negative transfer function (i.e. the optical signal is output through the output terminal 16b of the interferometer 10), the transfer function is expressed by the following equation (2).

$$P1c = T1 \times Tm \times P0 \times (\cos[a1 \times P0/2])^2 \tag{2}$$

P1c: the output optical power of the output port 16b of the interferometer 10

When the first-stage interferometer has a negative transfer function and the second-stage interferometer has a positive transfer function (i.e. the optical signal is output with the configuration shown in FIG. 8A), the transfer function is expressed by the following equation (3).

$$P2css = P1c \times (\sin[a2 \times P1c/2])^2 \quad (3)$$

P2css: the output optical power of the output port 26a of the interferometer 20 when the interferometer 10 has a negative transfer function a2: the difference in phase shift between two paths (the highly nonlinear optical fiber 22 and the low nonlinearity optical fiber 23) consisting the interferometer 20, proportional to unit optical power.

When the first-stage interferometer has a positive transfer function and the second-stage interferometer has a negative transfer function (i.e. the optical signal is output with the configuration shown in FIG. 3), the transfer function is expressed by the following equation (4).

$$P2scc = P1s \times (\cos[a2 \times P1s/2])^2 \quad (4)$$

P2scc: the output optical power of the output port 26b of the interferometer 20 when the interferometer 10 has a positive transfer function When both the first-stage interferometer and the second-stage interferometer have a negative transfer function (i.e. the optical signal is output with the configuration shown in FIG. 8B), the transfer function is expressed by the following equation (5).

$$P2ccc = P1c \times (\cos[a2 \times P1c/2])^2 \quad (5)$$

P2ccc: the output optical power of the output port 26b of the interferometer 20 when the interferometer 10 has a negative transfer function Embodiment 2-1

Configuration: See FIG. 8A

The Transfer Function: Equation (3)

The transfer function equation (3) can be expanded using the equation (2).

$$P2css = P1c \times (\sin[a2 \times P1c/2])^2 = P1c \times (\sin[a2 \times T1 \times Tm \times P0 \times (\cos[a1 \times P0/2])^2])^2 \quad (6)$$

In the equation (6), the output optical power (P2css) is mostly determined by "a2×T1×Tm" and "a1".

Figure 28:
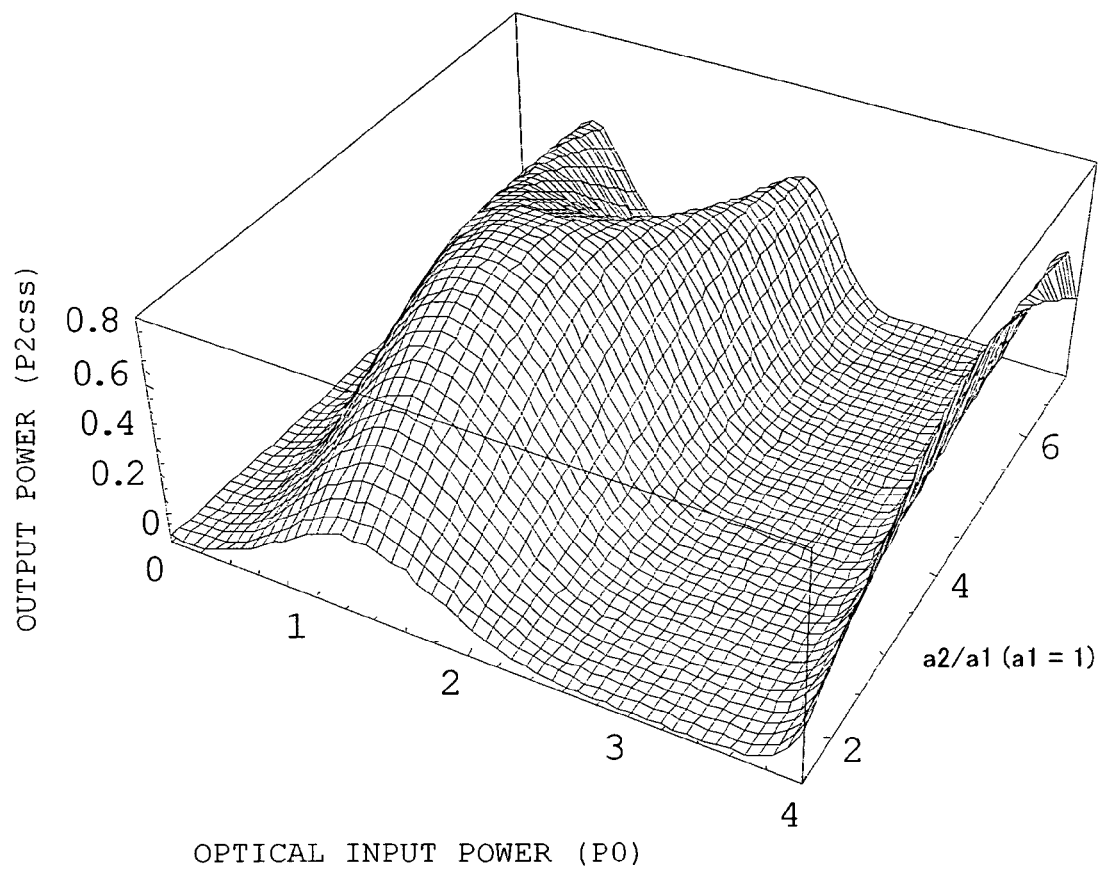
FIG. 28 shows the transfer function (1) of the embodiment 2-1.
Figure 29:
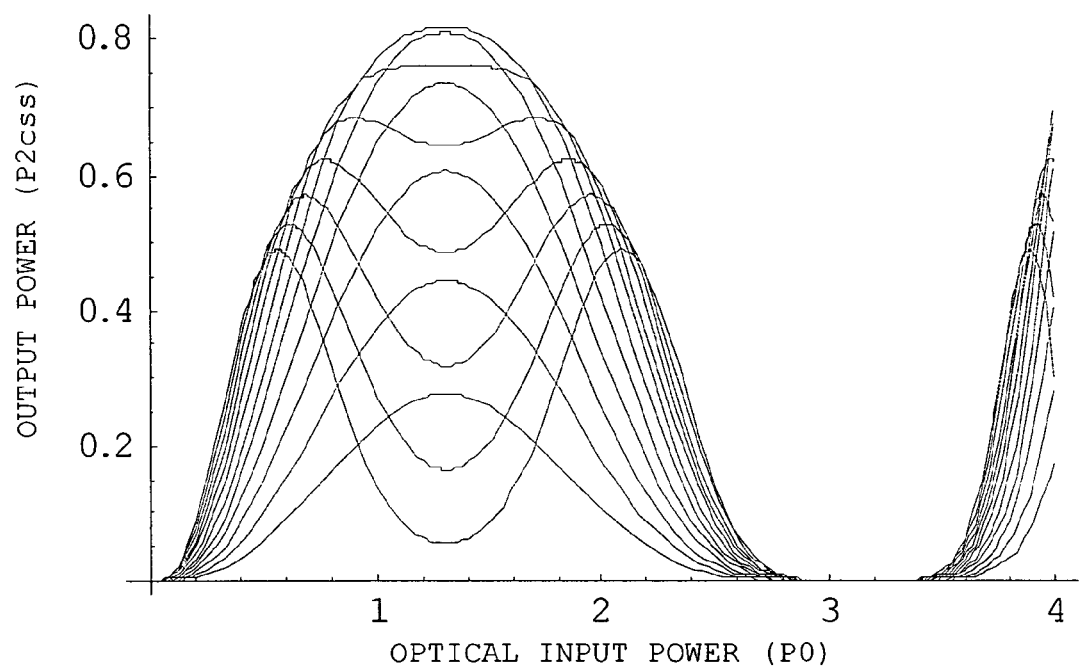
FIG. 29 is a cross-section of the 3D graph indicated in FIG. 28.

FIG. 28 shows the output optical power (P2css) within the range of "1.5<a2/a1×T1×Tm<7". In FIG. 28, the conditions are given as "T1×Tm=1" and "a1=1". FIG. 28, therefore, shows the relationship between the input optical power and the output optical power using the parameter "a1/a2". FIG. 29, in addition, is a cross-section intersecting the 3D graph of FIG. 28 at "a2/a1".

The output optical power (P2css) shows smooth change within the range of the following condition (7). As shown in FIG. 29, if an appropriate value of "a2/a1" is chosen, a favorable transfer function with a wide marked flat region can be obtained.

$$1.5 < a2/a1 \times T1 \times Tm < 7 \quad (7)$$

Within the range of the condition (7), the 3D graph of the output optical power (P2css) has a fixed shape. The 3D graphs, when the parameter is changed, are shown in FIG. 30 through FIG. 32.

Figure 30:
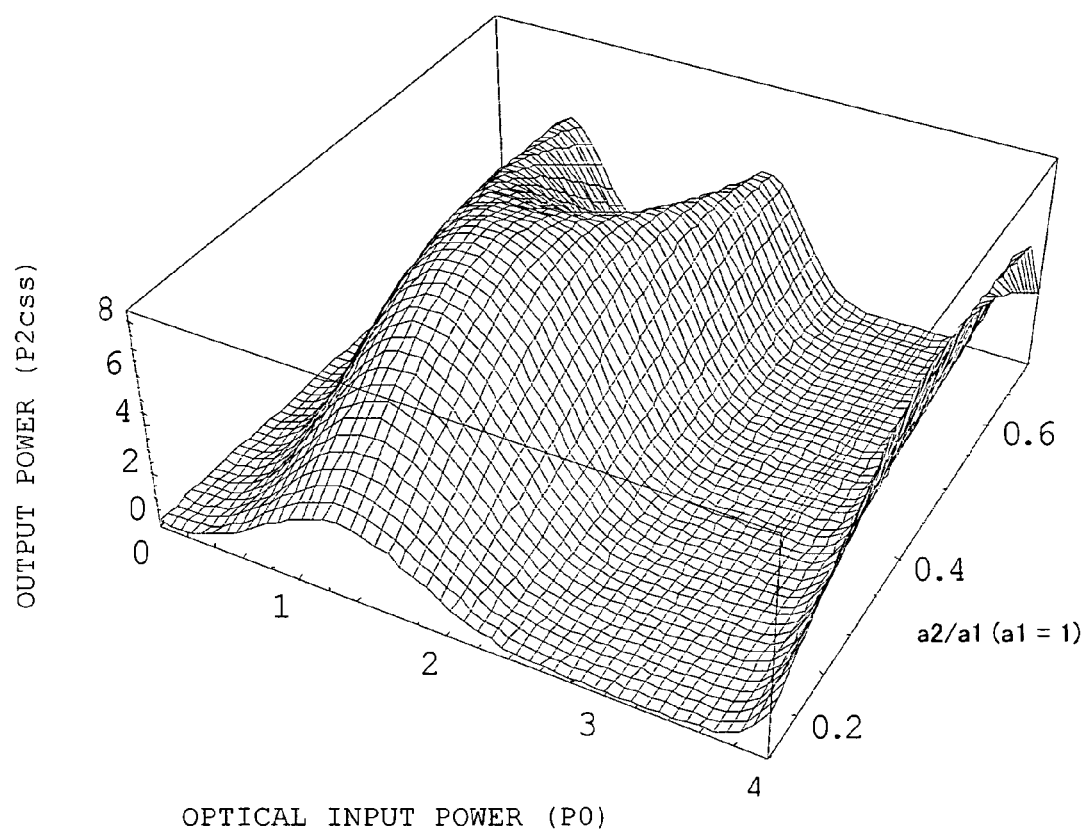
FIG. 30 shows the transfer function (2) of the embodiment 2-1.

FIG. 30 indicates the output optical power (P2css) when "T1×Tm=10". Specifically, FIG. 30 shows the transfer function with "T1×Tm" 10 times larger than that of FIG. 28. In such a case, a 3D graph with the same shape (i.e. a homothetic shape) as the one show in FIG. 28 can be obtained by using the tenth part of "a2/a1".

Figure 31:
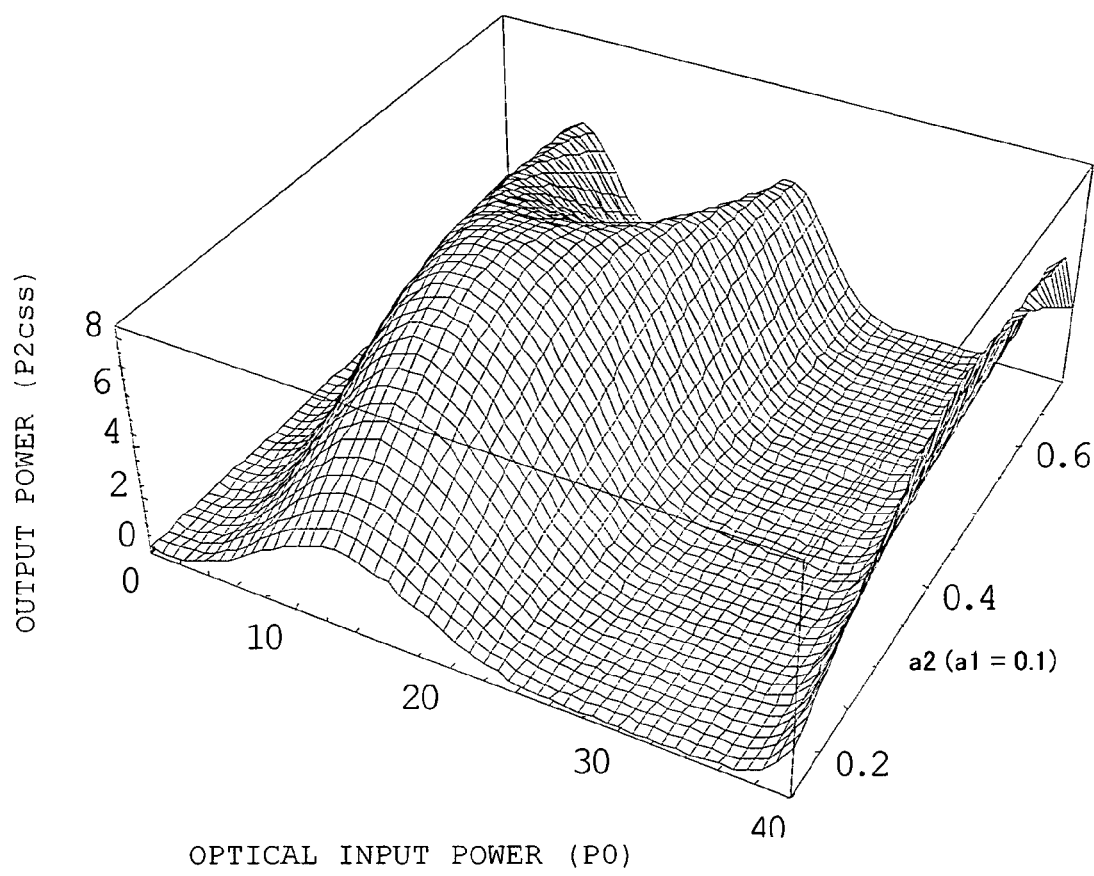
FIG. 31 shows the transfer function (3) of the embodiment 2-1.

FIG. 31 shows the output optical power (P2css) when "a1 =0.1" and "T1×Tm=1". Specifically, FIG. 31 shows the transfer function with "a1" 10 times smaller than that of FIG. 28. In such a case, the 3D graph with the same shape (i.e. a homothetic shape) as the one shown in FIG. 28 can be obtained by using the tenth part of "a2".

Figure 32:
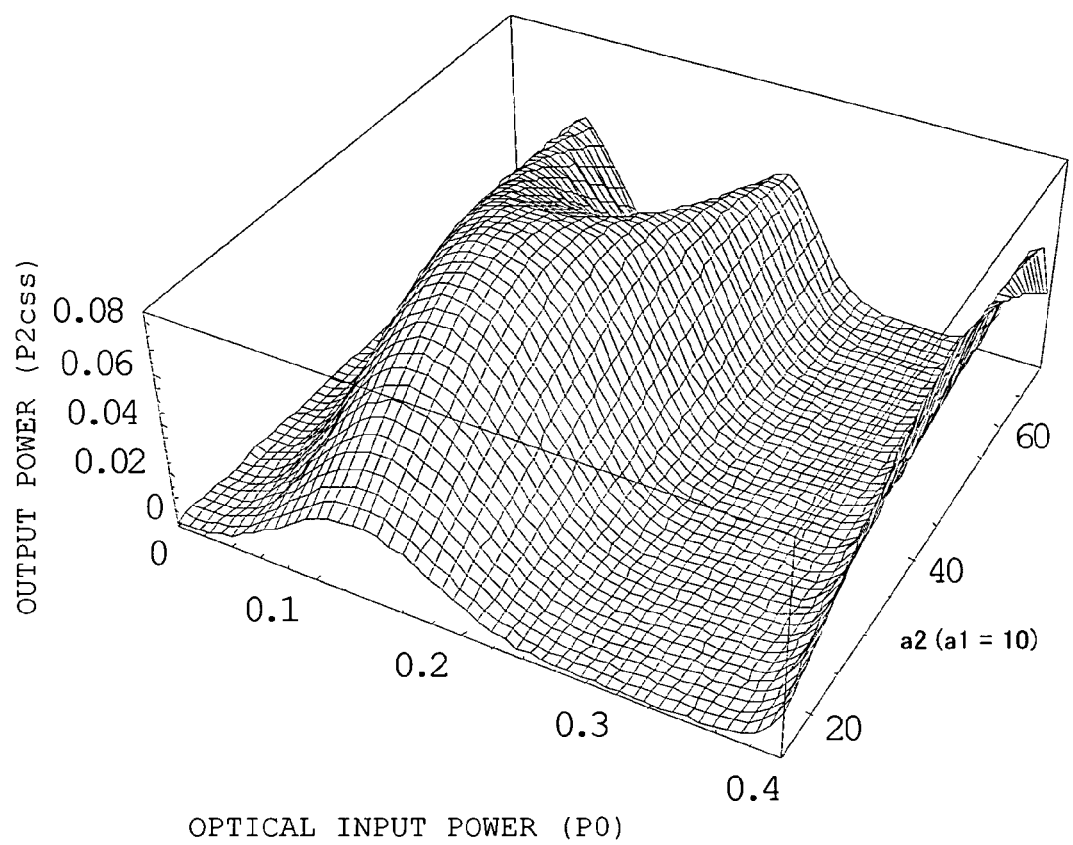
FIG. 32 shows the transfer function (4) of the embodiment 2-1.

FIG. 32 shows the output optical power (P2css) when "a1=10" and "T1×Tm=1". Specifically, FIG. 32 shows the transfer function with "a1" 10 times larger than that of FIG. 28. In such a case, a 3D graph with the same shape (i.e. a homothetic shape) as the one shown in FIG. 28 can be obtained by using tenfold "a2".

Figure 33:
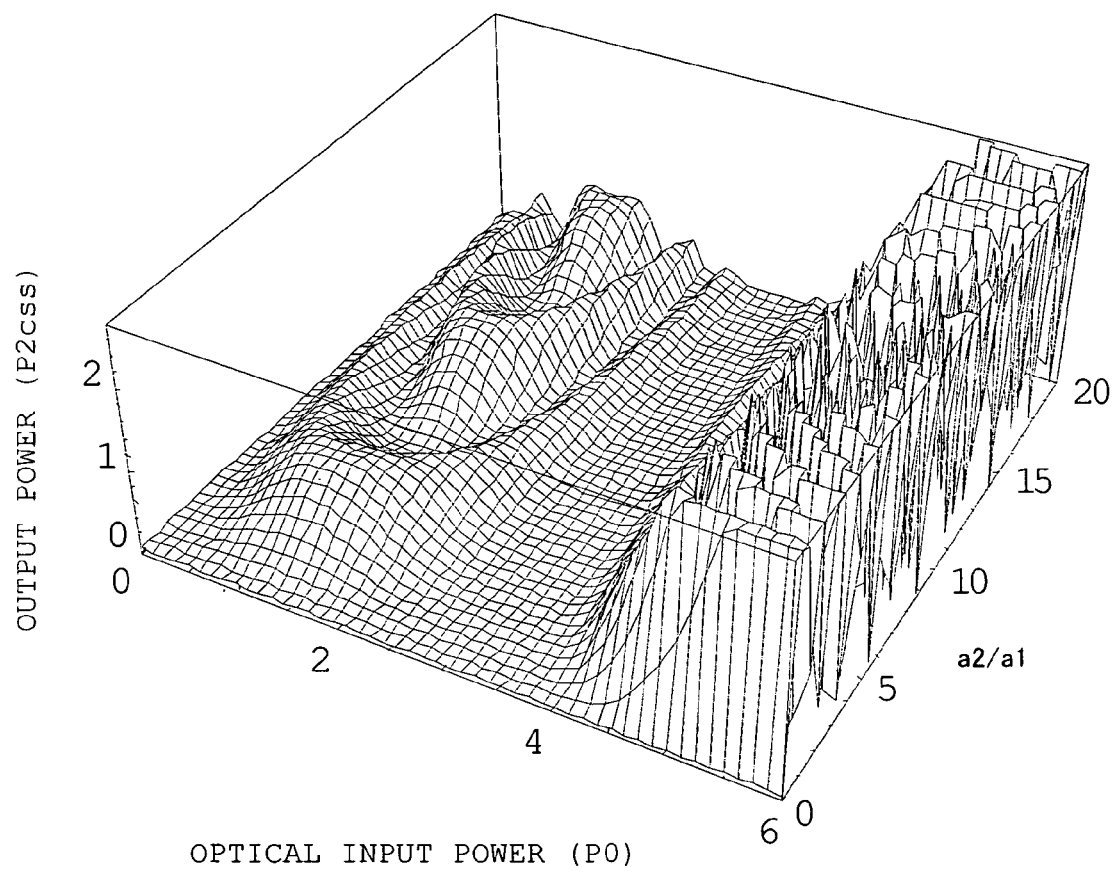
FIG. 33 shows the transfer function (5) of the embodiment 2-1.

As explained above, the range expressed in condition (7) does not change. FIG. 33 describes the output optical power (P2css) over a wider range than that of the condition (7). In such a case, a region in which the output optical power shows abrupt change with respect to the change in input optical power becomes apparent. For that reason, a wide flat mark region cannot be obtained over this range.

Embodiment 2-2

Configuration: See FIG. 8A

The Transfer Function: Equation (3)

The configuration and the transfer function for the embodiment 2-2 is the same as the embodiment 2-1 explained above. In this embodiment 2-2, a favorable transfer function with a wide flat mark region can be obtained within the range expressed in the following condition (8) as well as that of the condition (7).

$$0.2 < a2/a1 \times T1 \times Tm < 0.8 \quad (8)$$

Figure 34:
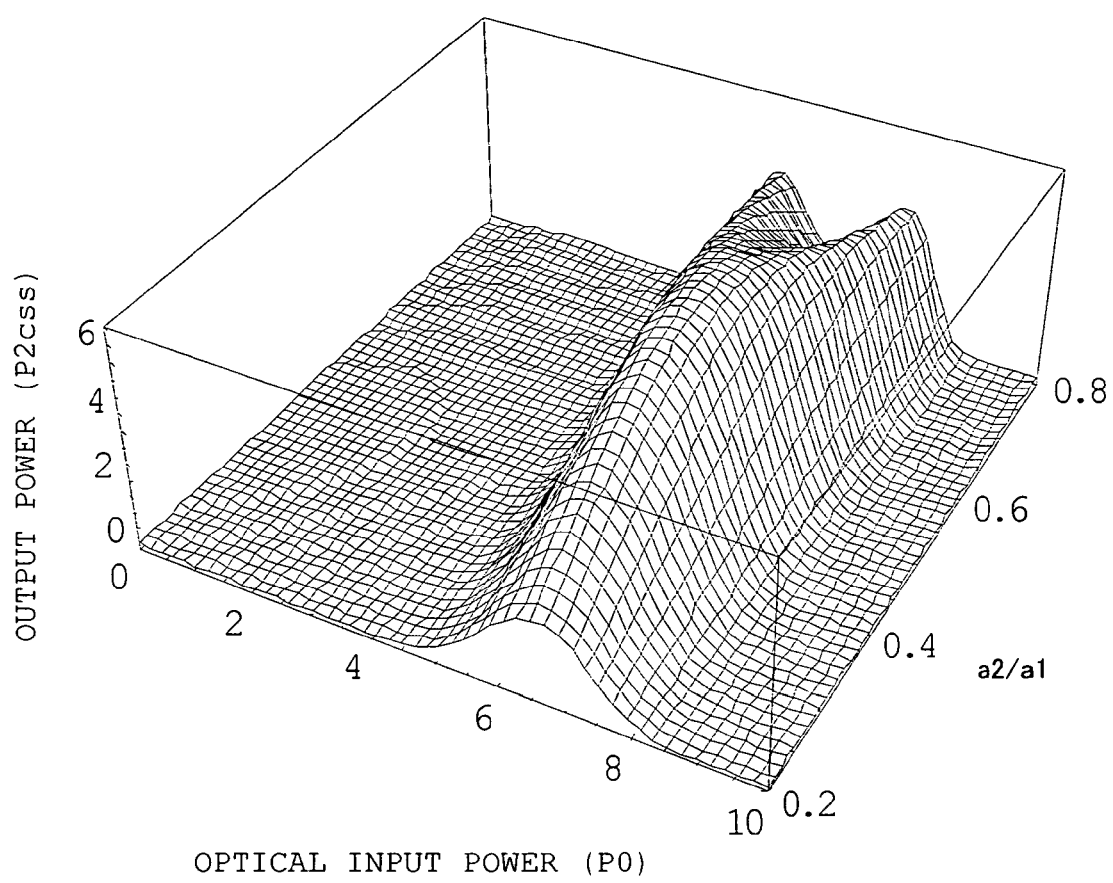
FIG. 34 shows the transfer function (1) of the embodiment 2-2.
Figure 35:
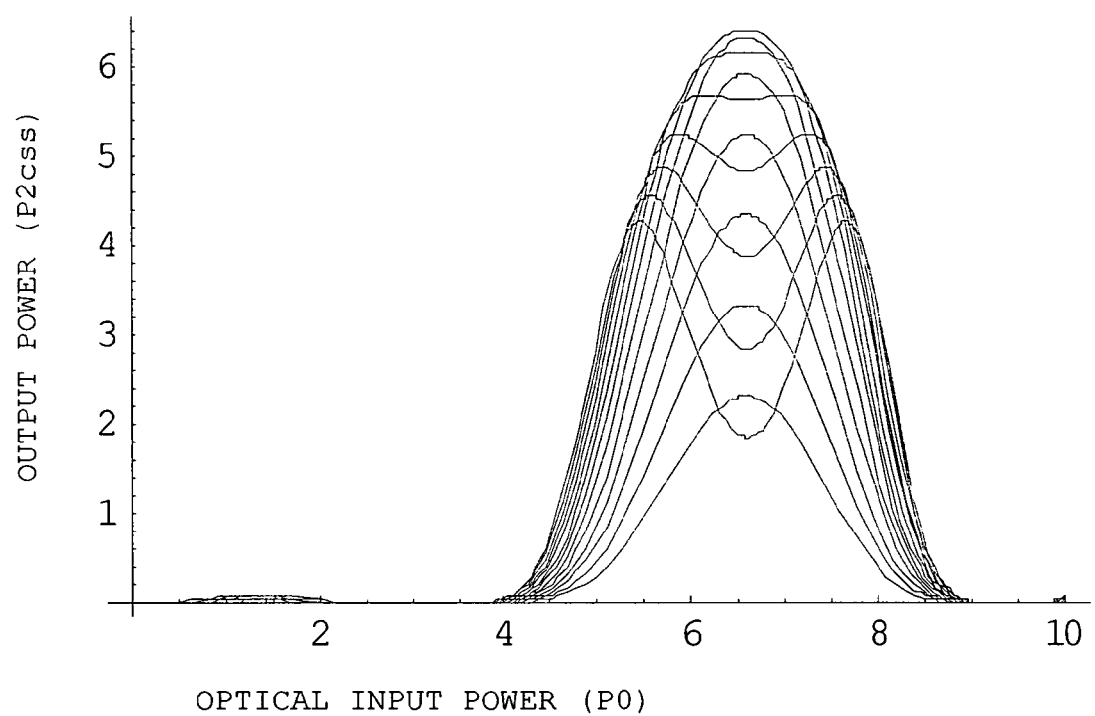
FIG. 35 is a cross-section of the 3D graph indicated in FIG. 34.

FIG. 34 shows the output optical power (P2css) with in the range expressed in the condition (8). In FIG. 34, the additional condition "T1×Tm=1" is given. FIG. 34, therefore, shows the relationship between the input optical power and the output optical power as a function of the parameter "a2/a1". FIG. 35 is a cross-section of the intersection of the 3D graph in FIG. 34 at "a2/a1".

The output optical power (P2css) shows smooth change within the range of condition (8). As shown in FIG. 35, if the appropriate value of "a2/a1" is chosen, a favorable transfer function with a wide flat mark region can be obtained. As long as the above condition (8) is satisfied, the 3D shape of the output optical power (P2css) does not change (i.e. homothetic shape). That is, in the embodiment 2-2, within the range expressed by condition (8) the 3D shape is fixed in a similar way to embodiment 2-1.

Figure 36:
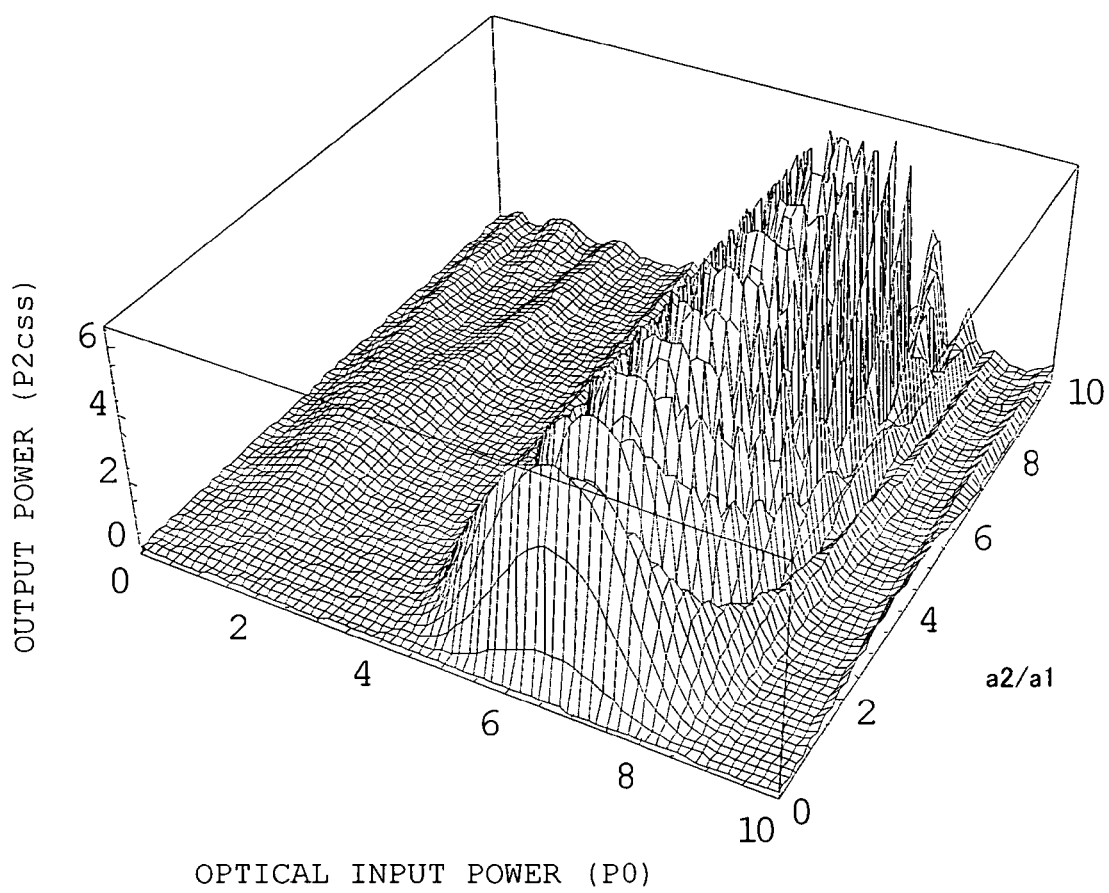
FIG. 36 shows the transfer function (2) of the embodiment 2-2.

FIG. 36 describes the output optical power (P2css) over a wider range than that of the condition (8). In such a case, the region in which the output optical power shows abrupt change with respect to the input optical power is apparent. For that reason, a wide marked flat region cannot be obtained over this range.

Embodiment 2-3

Configuration: See FIG. 3

The Transfer Function: Equation (4)

The transfer function equation (4) can be expanded using the equation (1).

$$\begin{aligned} P2scc &= P1s \times (\cos[a2 \times P1s/2])^{\wedge}2 \\ &= P1s \times (\cos[a2 \times T1 \times Tm \times P0 \times \\ &\quad (\sin[a1 \times P0/2])^{\wedge}2])^{\wedge}2 \end{aligned} \quad (9)$$

In the equation (9), the output optical power (P2scc) is mostly determined by "a2×T1×Tm" and "a1".

Figure 37:
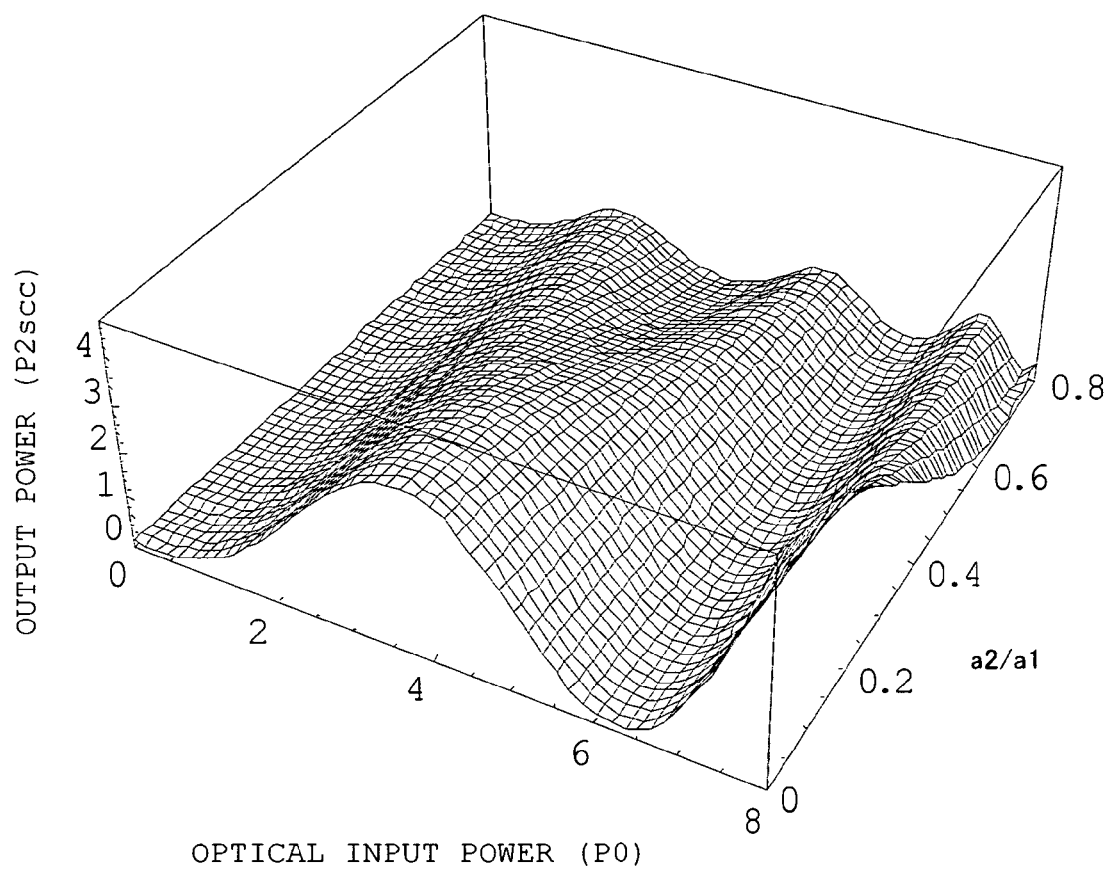
FIG. 37 shows the transfer function (1) of the embodiment 2-3.
Figure 38:
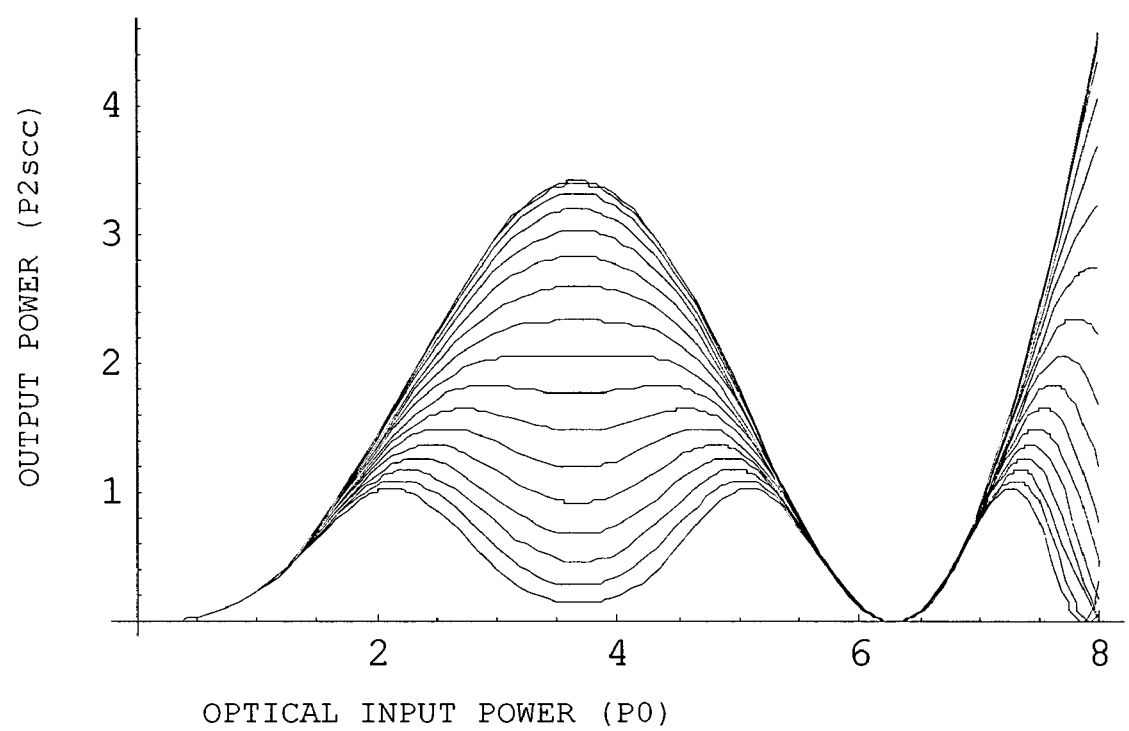
FIG. 38 is a cross-section of the 3D graph indicated in FIG. 37.

FIG. 37 shows the output optical power (P2scc) within the range of "0<a2/a1×T×Tm<0.8". In FIG. 37, a condition is given as "T1×Tm=1". FIG. 37, therefore, shows the relationship between the input optical power and the output optical power as a function of the parameter "a2/a1". FIG. 38 is a cross-section of the intersection of the 3D graph of FIG. 37, at "a2/a1".

The output optical power (P2scc) shows smooth change within the range of the following condition (10). As shown in FIG. 38, if the appropriate value is set as "a2/a1", a favorable transfer function with a wide flat mark region can be obtained.

$$0 < a2/a1 \times T1 \times Tm < 0.8 \tag{10}$$

As long as the above condition (10) is satisfied, the 3D shapes of the output optical power (P2scc) do not change (i.e. have a homothetic shape). That is, in the embodiment 2-3 also, within the range expressed by the condition (10), the 3D shape is fixed, in a similar way to the case of the embodiment 2-1.

Figure 39:
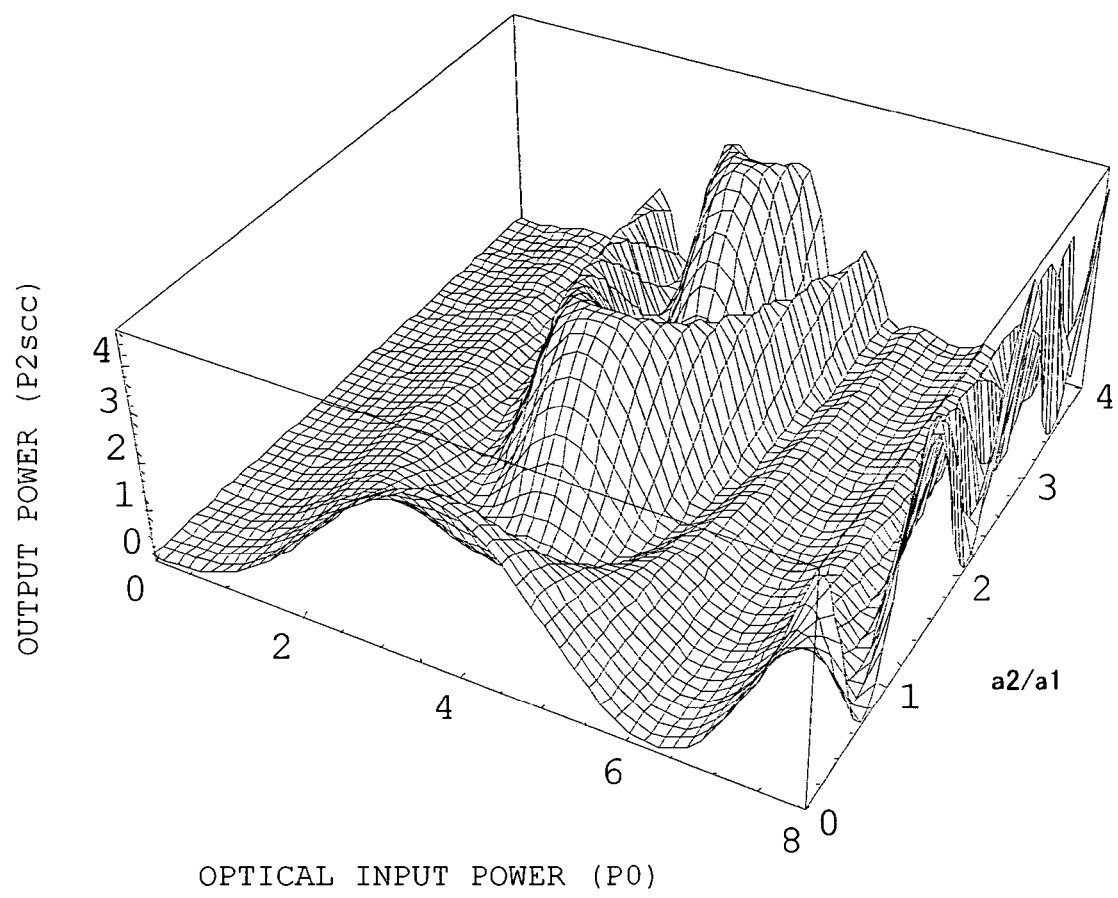
FIG. 39 shows the transfer function (2) of the embodiment 2-3.

FIG. 39 describes the output optical power (P2scc) over a wider range than that of the condition (10). In such a case, the region in which the output optical power shows abrupt change to the change in input optical power is apparent. For that reason, a wide flat mark region cannot be obtained over this range.

Embodiment 2-4

Configuration: See FIG. 8B

The Transfer Function: Equation (5)

The transfer function equation (5) can be expanded using the equation (2).

$$P2ccc = P1c \times (\cos[a2 \times P1c/2])^{\wedge}2 \tag{11}$$
$$= P1c \times (\cos[a2 \times T1 \times Tm \times P0 \times$$
$$(\cos[a1 \times P0/2])^{\wedge}2])^{\wedge}2$$

In the equation (11), the output optical power (P2ccc) is mostly determined by "a2×T1×Tm" and "a1".

Figure 40:
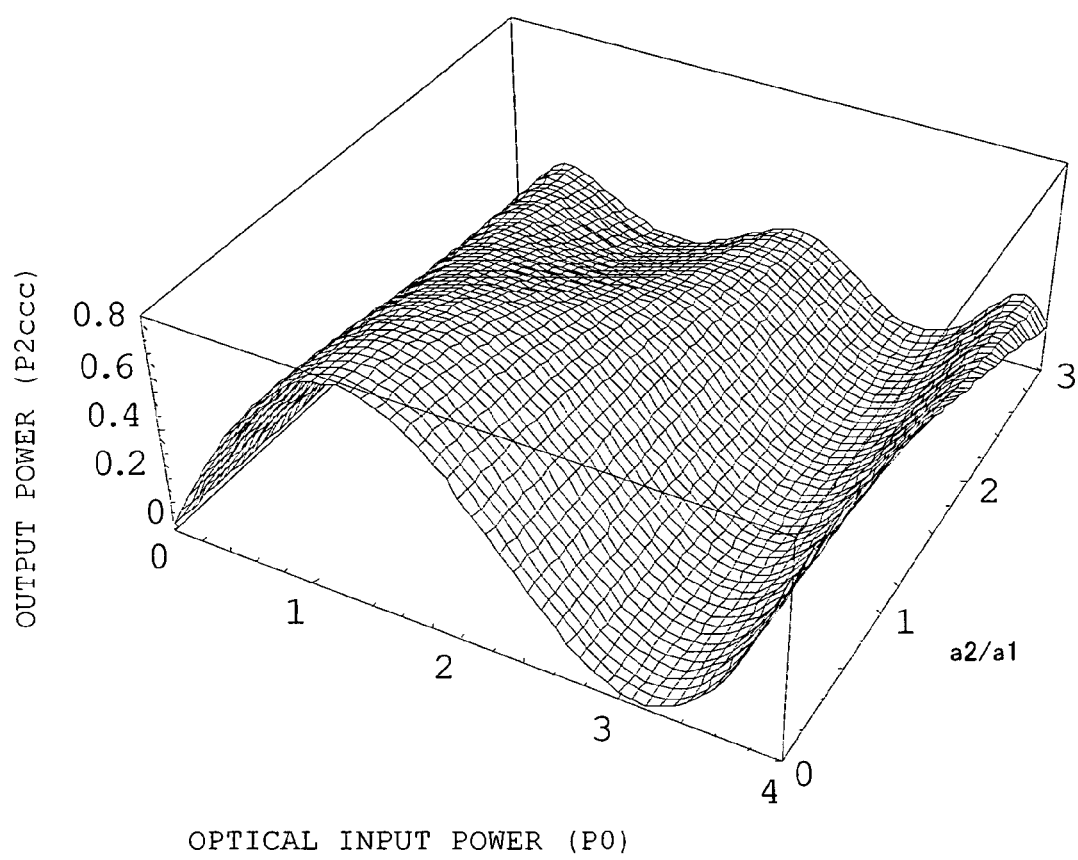
FIG. 40 shows the transfer function (1) of the embodiment 2-4.
Figure 41:
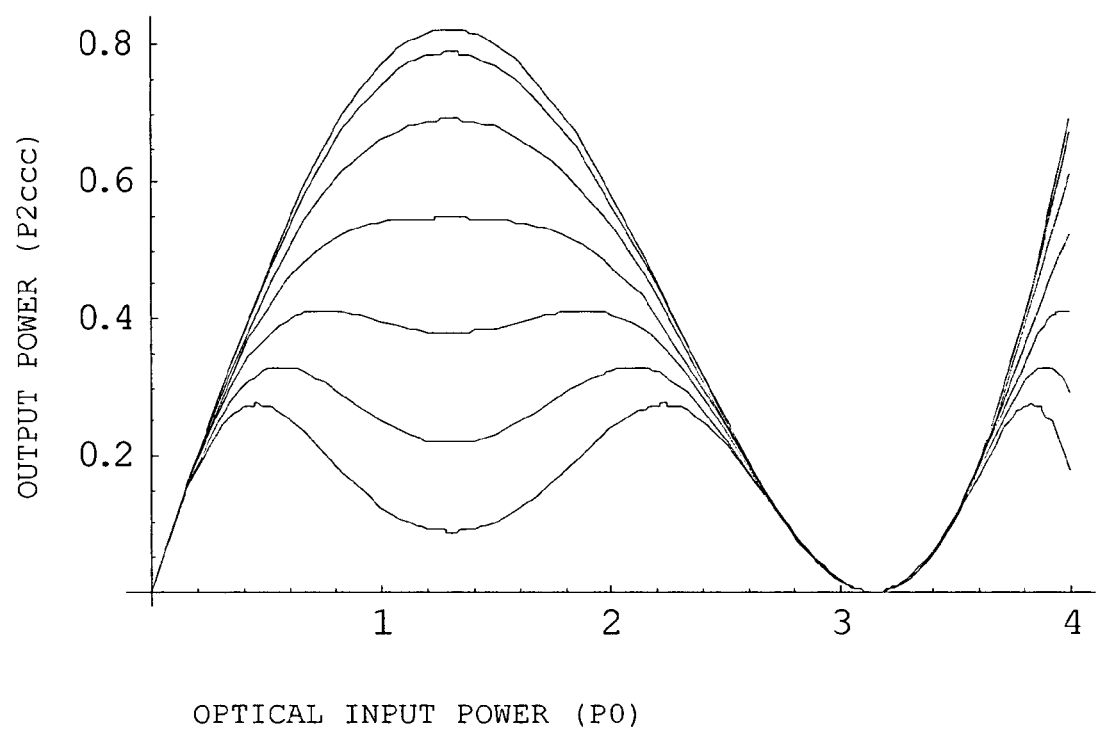
FIG. 41 is a cross-section of the 3D graph indicated in FIG. 40.

FIG. 40 shows the output optical power (P2ccc) within the range of "0<a2/a1×T1×Tm<3". In FIG. 40, a condition is given as "T1×Tm=1". FIG. 40, therefore, shows the relationship between the input optical power and the output optical power as a function of the parameter "a2/a1". FIG. 41 is a cross-section of the intersection of the 3D graph of FIG. 40, at "a2/a1".

The output optical power (P2ccc) shows smooth change within the range of the following condition (12). As shown in FIG. 41, if the appropriate value is chosen for "a2/a1", a favorable transfer function with a wide marked flat region can be obtained.

$$0 < a2/a1 \times T1 \times Tm < 3 \tag{12}$$

As long as the above condition (12) is satisfied, 3D shapes of the output optical power (P2ccc) are the same (i.e. homothetic shape). That is, in the embodiment 2-4, within the range expressed by the condition (12) the 3D shape is fixed, in a similar way to the embodiment 2-1.

Figure 42:
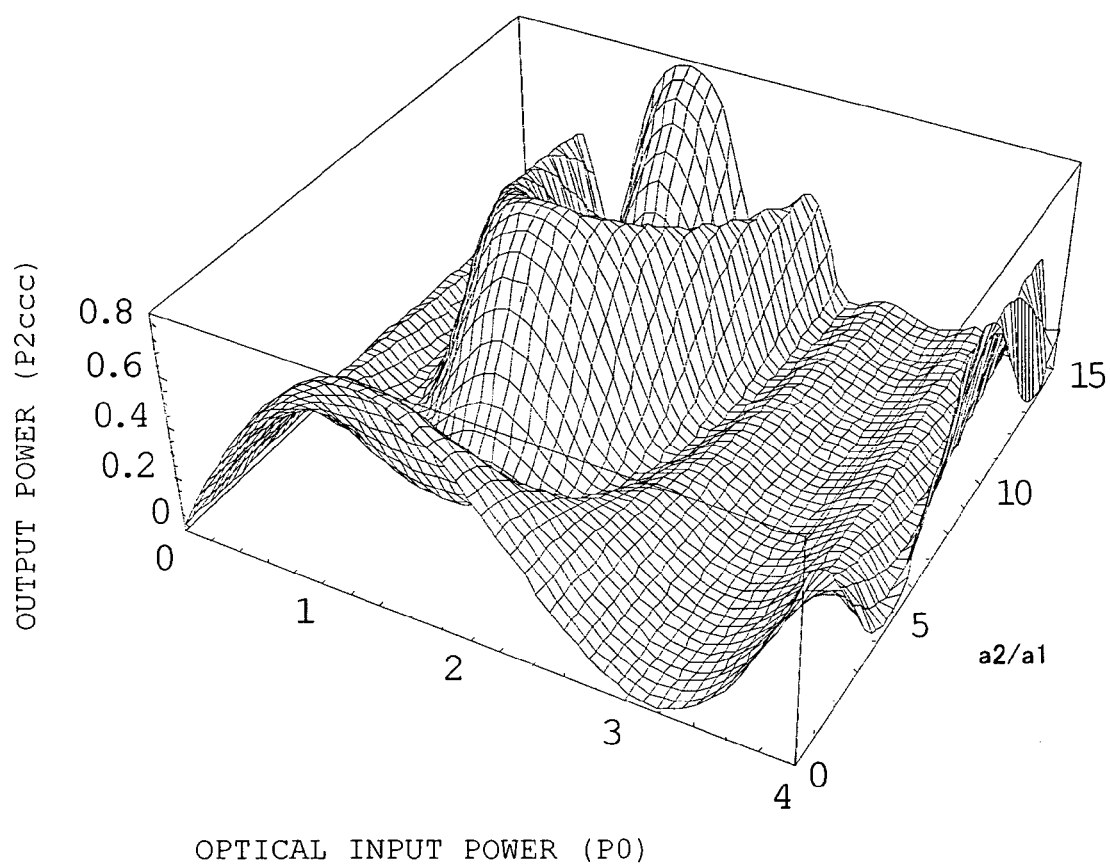
FIG. 42 shows the transfer function (2) of the embodiment 2-4.

FIG. 42 describes the output optical power (P2ccc) over a wider range than that of the condition (12). In such a case, a region in which the output optical power shows abrupt change to variation in the input optical power is apparent. For that reason, a wide flat mark region cannot be obtained over this range.

Figure 43:
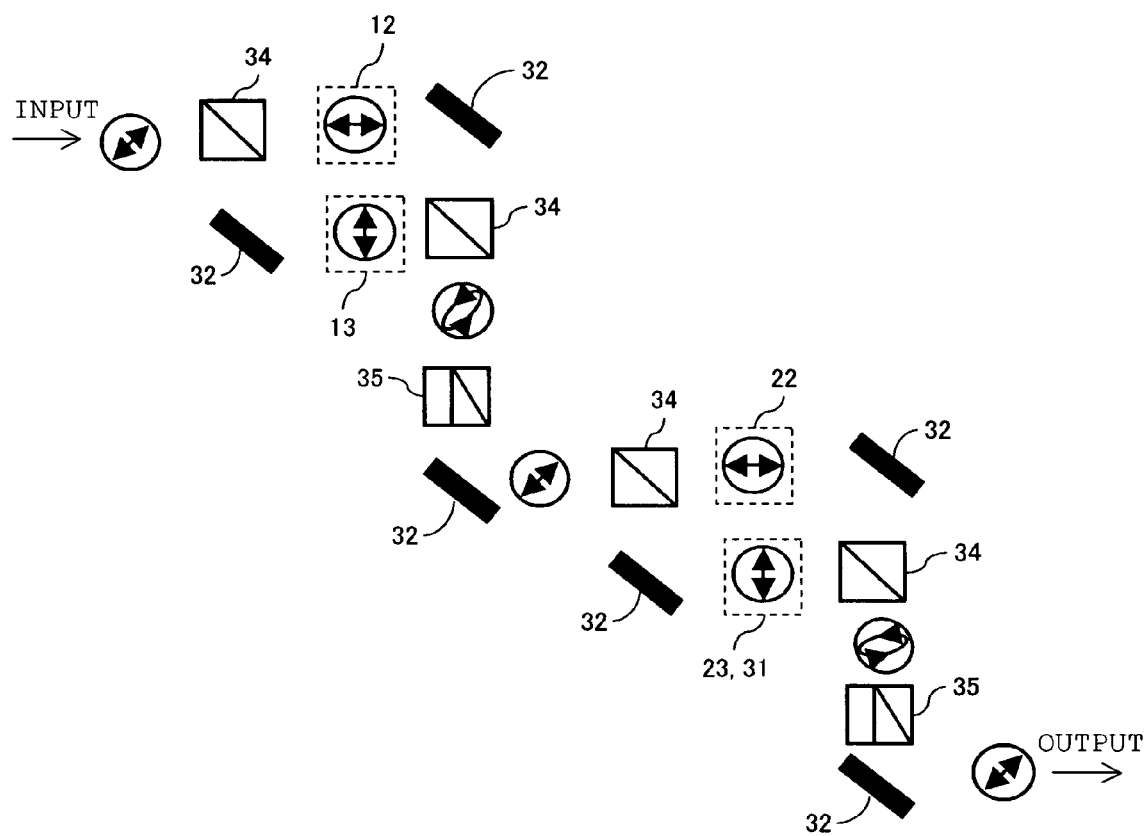
FIG. 43 shows example polarization states in the optical waveform shaper of the seventh configuration.

In the following description, a detailed explanation of the seventh configuration shown in FIG. 12B is provided. FIG. 43 describes an example of the polarization states of the optical waveform shaper of the seventh configuration. In FIG. 43, arrows in circles indicate the oscillation direction of the electric field viewed transversely from the source side of the optical signal. The vertical direction and the horizontal direction indicated by the arrows, in FIG. 43, correspond to the direction perpendicular to the paper and the direction parallel to the paper, respectively in FIG. 12B.

Figure 44A:
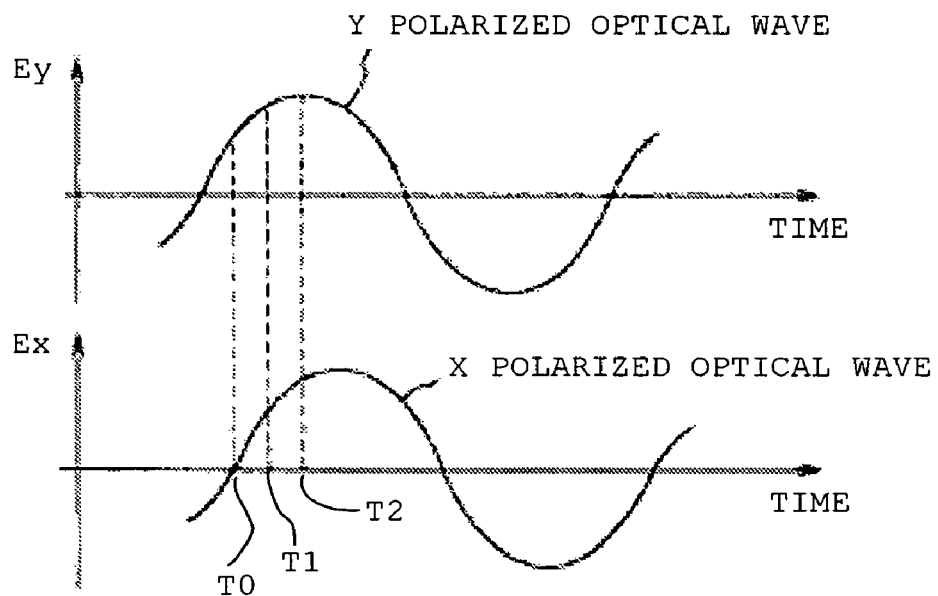
FIGS. 44A-44B explain the elliptical polarization of the synthesized optical signal, generated by the phase difference between the orthogonal polarized waves.
Figure 44B:
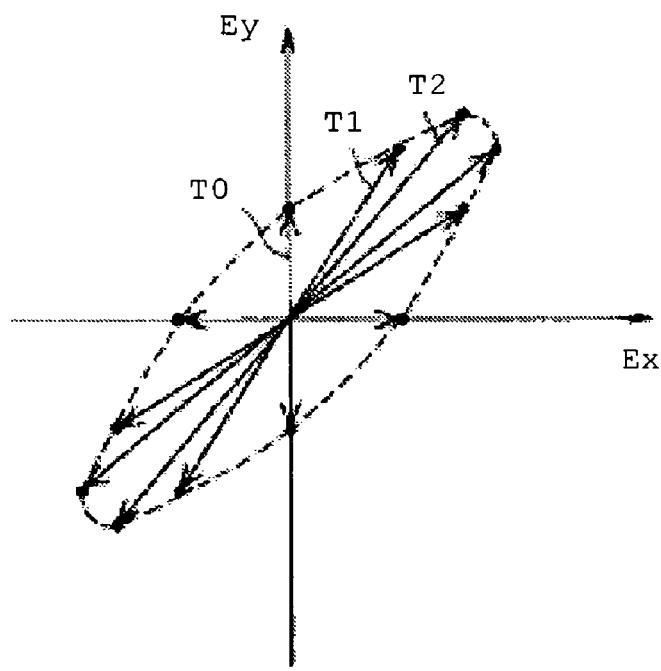

The reason the polarization of the signal synthesized by the polarizer 34 is elliptical after passing through the first-stage interferometer, shown in FIG. 12B and FIG. 43, is because of the phase difference, generated by self phase modulation between the two polarized signals, as shown in FIG. 44A and FIG. 44B. FIG. 44A describes the phases of the mutually-perpendicular polarized optical waves, and FIG. 44B shows the polarization state of the signal synthesized from these polarized optical waves.

In the optical waveform shaper of the seventh configuration, the same linearly polarized elements which are input to the first-stage interferometer are extracted from the elliptically polarized output by the polarizer 35, and the extracted linearly polarized elements are input to the second-stage interferometer. In the second-stage interferometer, a phase difference of π is applied to one path so that the linear polarization of the interferometer output is in a direction perpendicular to the input linear polarization. By so doing, operation equivalent to the extraction of polarization elements orthogonal to the output polarization of the first-stage interferometer can be achieved. Such an operation can be also realized in FIG. 12B, without providing the phase difference of π, by arranging the output of the first-stage and the second-stage polarizer 35 orthogonally to each other on a plain perpendicular to the direction of propagation of the optical signal.

The following description shows how a polarization-modulation interferometer, with a phase difference generated by self phase modulation, is functionally equivalent to a Mach-Zehnder interferometer. In the following description, it is assumed that the plain which is orthogonal to the direction of the optical signal propagation is the plain PLN1, in the plain PLN1 the direction parallel to the plain of FIG. 12B is the X-axis, and the direction orthogonal to the X-axis in the plain PLN1 is the Y-axis.

The electric field element parallel to the X-axis is "E1x", the electric field element parallel to the Y-axis is "E1y", and the phase difference generated by self phase modulation of the optical signal in the highly nonlinear optical fiber 12 is "Δϕ1". The phase difference in the low nonlinearity optical fiber 13, optical coupling loss and polarization by the self phase modulation is disregarded. Then, the electric field E1x and the electric field E1y can be expressed by the following equations.

$$E1x = \sqrt{2}/2 \cdot \sqrt{Tr1} \cdot E0 \cdot \cos(\omega t + \theta + \Delta\phi 1)$$

$$E1y = \sqrt{2}/2 \cdot \sqrt{Tr1} \cdot E0 \cdot \cos(\omega t + \theta)$$

Where "E0" is the intensity of the electrical field of the optical signal, "ω" is the angular frequency, "t" is time, "θ" is the phase delay, and "Tr1" is the transmissivity of the optical fibers 12 and 13.

Figure 45:
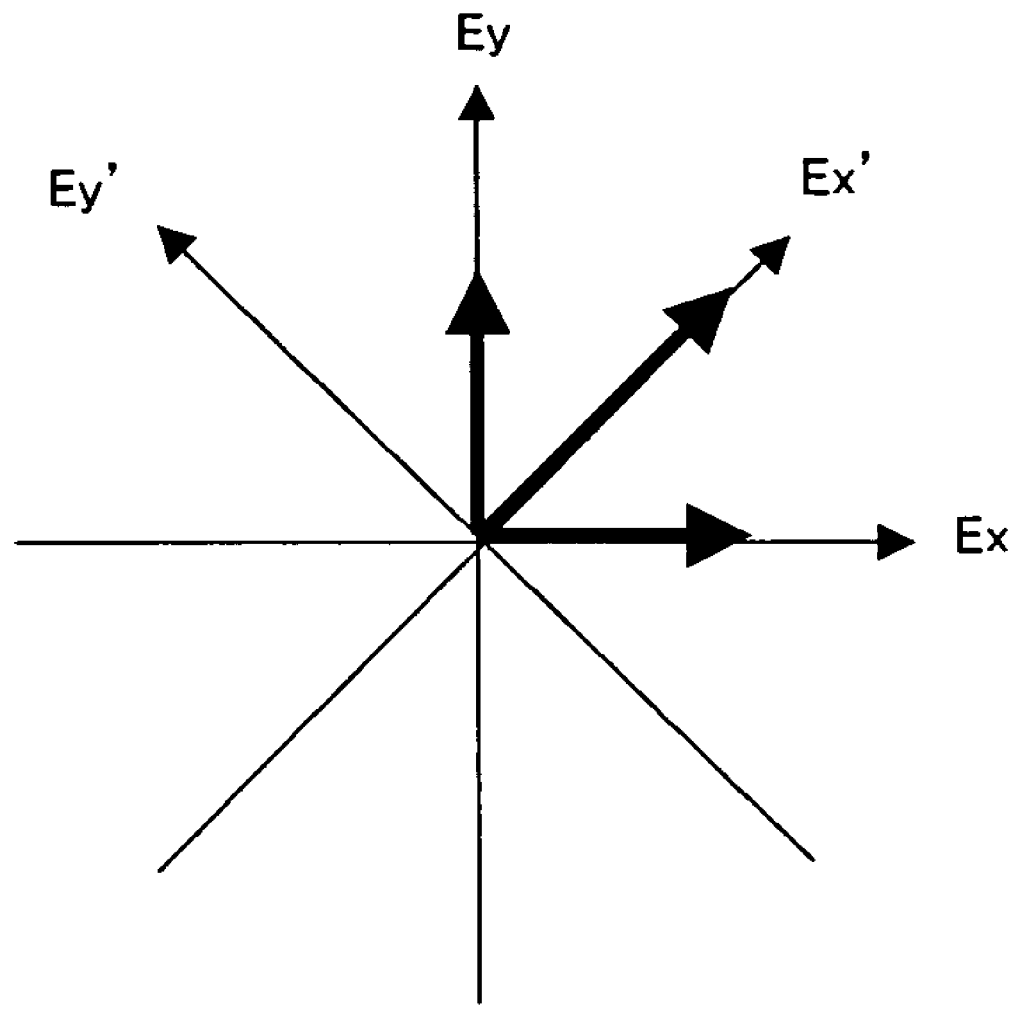
FIG. 45 explains the rotation of the electrical field.

As shown in FIG. 45, the axes with the directions corresponding to two polarization states output by the polarizer 35 are referred to as the X'-axis and the Y'-axis, respectively, the electric field E1x' parallel to the X'-axis is expressed as below.

$$E1x' = \sqrt{2}/2 \cdot (E1x + E1y)$$
$$= \sqrt{Tr1}/2 \cdot E0 \cdot (\cos(\omega t + \theta + \Delta\varphi 1) + \cos(\omega t + \theta))$$
$$= \sqrt{Tr1} \cdot E0 \cdot \cos(\omega t + \theta + \Delta\varphi 1/2) \cdot \cos(\Delta\varphi 1/2)$$

Where "E1x'=$\sqrt{Tr1}$·E0·cos($\omega$t+$\theta$)" is obtained when "$\Delta\phi$1/2=0", and "E1x'=0" is obtained when "$\Delta\phi$1/2=$\pi$/2".

The X'-axis element of the optical output from the polarizer 35 is maximized when a phase change of $\Delta\phi$1, generated by the optical signal input in the highly nonlinear optical fiber 12, is "0", and is minimized when the phase change of $\Delta\phi$1 is "$\pi$".

The intensity Sout of the optical signal output by the polarizing interferometer is, if the loss in the polarizer is disregarded, expressed as below.

$$Sout1 = E1x'^\wedge 2$$
$$= Tr1 \cdot \{E0 \cdot \cos(\omega t + \theta + \Delta\varphi 1/2) \cdot \cos(\Delta\varphi 1/2)\}^\wedge 2$$

Here, in the equation expressing the intensity Sout of the optical signal, the value $\{\cos(\omega t+\theta+\Delta\phi 1/2)\}^\wedge 2$ is dependent on the frequency of the optical signal $10^{14}$ Hz, and is generally measured as the average because it can be obtained only in average when it is measured by an optical receiver within the frequency band less than several $10^{10}$ Hz. Thus, the optical signal intensity Sout1 can be expressed as below.

$$Sout1 \propto \{\cos(\Delta\phi 1/2)\}^\wedge 2$$

In the second-stage interferometer, the oscillation direction of the electric field of the linearly polarized input is the same as the oscillation direction of the electric field of the linearly polarized input of the first-stage interferometer. Although it is a polarizing interferometer, because the polarizer 35 is placed between the first-stage and the second-stage interferometers, the influence on the second-stage polarizing interferometer by the first-stage polarizing interferometer is only a change of the input optical power. The electric field in the second-stage polarizing interferometer is, therefore, in a similar way to the first-stage polarizing interferometer, expressed as below. Here, in the second-stage polarizing interferometer, the electric field element parallel to the X-axis is "E2x", the electric field element parallel to the Y-axis is "E2y", the phase difference generated by self phase modulation of the optical signal in the highly nonlinear optical fiber 22 is "$\Delta\phi$2". The change in the phase difference in the low nonlinearity optical fiber 23, optical coupling loss, and the loss of the polarizer are disregarded. Then, the electric field E2x and the electric field E2y are expressed as the following.

$$E2x = \sqrt{2}/2 \cdot \sqrt{Tr2} \cdot E1x' \cdot \cos(\omega t + \theta + \Delta\varphi 2)$$

$$E2y = \sqrt{2}/2 \cdot \sqrt{Tr2} \cdot E1x' \cdot \cos(\omega t + \theta + \pi)$$

Here, "E1x'" is the electric field intensity of the optical signal output from the first-stage polarizing interferometer, and "Tr2" is the transmissivity of the optical fibers 22 and 23.

As in FIG. 45, when the axes with directions corresponding to two polarizations output from the polarizer 35 are referred to as the X'-axis and the Y'-axis, respectively, the electric field E2x' parallel to the X'-axis is expressed as below.

$$E2x' = \sqrt{2}/2 \cdot (E2x + E2y)$$
$$= \sqrt{Tr2}/2 \cdot E1x' \cdot (\cos(\omega t + \theta + \Delta\varphi 2) + \cos(\omega t + \theta + \pi))$$
$$= \sqrt{Tr2}/2 \cdot E1x' \cdot (\cos(\omega t + \theta + \Delta\varphi 2) - \cos(\omega t + \theta))$$
$$= \sqrt{Tr2} \cdot E1x' \cdot \sin(\omega t + \theta + \Delta\varphi 2/2) \cdot \sin(\Delta\varphi 2/2)$$

Where "E2x'=$\sqrt{Tr2/2}$·E1x'·sin($\omega$t+$\theta$+$\pi$/2)" is obtained when "$\Delta\phi$2/2=$\pi$/2". And "E2x'=0" is obtained when "$\Delta\phi$2/2=0".

The X'-axis element of the optical output from the polarizer 35 is maximized when the phase change of $\Delta\phi$2, generated by optical signal input in the highly nonlinear optical fiber 22, is "$\pi$", and is minimized when the phase change of $\Delta\phi$2 is "0".

The intensity Sout2 of the optical signal output from the second-stage polarizing interferometer is, if the loss in the polarizer is disregarded, expressed as below.

$$Sout2 = E2x'^\wedge 2$$
$$= Tr2 \cdot \{E1x' \cdot \sin(\omega t + \theta + \Delta\varphi 2/2) \cdot \sin(\Delta\varphi 2/2)\}^\wedge 2$$

From the optical signal intensity Sout2, when expressed in the average value in the similar way to the optical signal intensity Sout1, the following relation ship can be obtained.

$$Sout2 \propto Tr2 \cdot \{E1x' \cdot \sin(\Delta\phi 2/2)\}^\wedge 2$$

Here, using "a1", "a2" and "P1c" defined in the embodiment 2 described above, "E1x'^2$\propto\{\cos(\Delta\phi 1/2)\}^\wedge 2$" and "$\Delta\phi$2" are expressed as below.

$$E1x'^2 = P1c \times Tr1/(T1 \times Tm)$$

$$\Delta\phi 2 = a2 \times P1c$$

When "Tr1=T1", the optical signal intensity Sout2 can be, therefore, expressed as the following.

$$Sout2 \propto Tr2/Tm \cdot P1c \cdot \{\sin(a2 \times P1c/2)\}^\wedge 2$$

This equation is equal to the equation (3) in the above embodiment 2 where "Tm=1". However, in the equation (3) in the embodiment 2, the loss is disregarded as "Tr2=1"

When similar logic is applied, the output power of the configuration in which the first-stage polarizing interferometer and the second-stage polarizing interferometer, shown in FIG. 12B, are switched gives the same result as that of equation (4) of the above embodiment 2.

In addition, the configuration in which two of the first-stage interferometers, shown in FIG. 12B, are connected can be represented by equation (5) of the above embodiment 2.

In such a way, similar argument to the above embodiment 2 can be developed with respect to the polarizing-interferometer optical waveform shaper shown in FIG. 12B.

What is claimed is:

1. An optical waveform shaper, comprising:
 a polarization device which splits an optical signal into first and second polarization element being perpendicular to one another;
 first and second optical waveform shaping units which carry out waveform shaping for the first and second polarization elements, respectively; and a polarization device which carries out the polarization-coupling of the outputs from said first and second optical waveform-shaper units, wherein each of said first and second optical waveform shaping units is an optical waveform shaper including a first interferometer and a second interferometer, wherein one of the first and second interferometers has a first transfer function, where the second order derivative of output optical power in respect to the input optical power is positive when the input optical power is zero or substantially zero, and the output optical power shows substantially periodic changes with respect to the input optical power, the other of the first and second interferometers has a second transfer function, where the second order derivative of output optical power in respect to the input optical power is negative when the input optical power is zero or substantially zero, and the output optical power shows substantially periodic changes with respect to the input optical power, each of the first and second interferometers has first and second input ports and first and second output ports, an optical path from the first input port to the first output port in each of the first and second interferometers provides the first transfer function, and an optical path from the first input port to the second output port in each of the first and second interferometers provides the second transfer function, an input optical signal is provided to the first input port of the first interferometer, the output optical signal from the first output port of the first interferometer is guided to the first input port of the second interferometer, and the second output port of the second interferometer is coupled to an output port of the optical waveform shaper, and wherein the first and second transfer functions are determined in such a way that a total transfer function of the first and second transfer functions satisfies the conditions of FWm/FWs>1, and Wtr<FWm, and wherein FWm is a width of a region where output power of the optical waveform shaper is substantially flat at a high-emission level with respect to input power of the optical waveform shaper, FWs is a width of a region where output power of the optical waveform shaper is substantially flat at a low-emission level with respect to input power of the optical waveform shaper, and Wtr is a width of a region where output power of the optical waveform shaper rises from the low-emission level to the high-emission level with respect to input power of the optical waveform shaper.

2. An optical waveform shaper comprising:

a first interferometer and a second interferometer connected in series, wherein one of the first and second interferometers has a first transfer function, where the second order derivative of output optical power in respect to the input optical power is positive when the input optical power is zero or substantially zero, and the output optical power shows substantially periodic changes with respect to the input optical power, the other of the first and second interferometers has a second transfer function, where the second order derivative of output optical power in respect to the input optical power is negative when the input optical power is zero or substantially zero, and the output optical power shows substantially periodic changes with respect to the input optical power, each of the first and second interferometers has first and second input ports and first and second output ports, an optical path from the first input port to the first output port in each of the first and second interferometers provides the first transfer function, and an optical path from the first input port to the second output port in each of the first and second interferometers provides the second transfer function, an input optical signal is provided to the first input port of the first interferometer, the output optical signal from the first output port of the first interferometer is guided to the first input port of the second interferometer, and the second output port of the second interferometer is coupled to an output port of the optical waveform shaper, and wherein the first and second transfer functions are determined in such a way that a total transfer function of the first and second transfer functions satisfies the conditions of FWm/FWs>1, and Wtr<FWm, and wherein FWm is a width of a region where output power of the optical waveform shaper is substantially flat at a high-emission level with respect to input power of the optical waveform shaper, FWs is a width of a region where output power of the optical waveform shaper is substantially flat at a low-emission level with respect to input power of the optical waveform shaper, and Wtr is a width of a region where output power of the optical waveform shaper rises from the low-emission level to the high-emission level with respect to input power of the optical waveform shaper.

3. The optical waveform shaper according to claim 2, wherein the interferometer comprises:

an input port;

first and second propagation paths, with different optical nonlinearities from one another, propagating the optical signal input through said input port;

a coupler which couples the optical signals propagated by said first and the second propagation paths; and an output port which outputs the optical signal coupled by said coupler.

4. The optical waveform shaper according to claim 3, wherein the interferometer is a Mach-Zehnder interferometer.

5. The optical waveform shaper according to claim 3, wherein the phase difference is generated between the optical signal propagated in said first propagation path and the optical signal propagated in said second propagation path by self phase modulation of the input optical signals in said first and/or second propagation path.

6. The optical waveform shaper according to claim 2, wherein, at least a part of a pair of optical propagation paths generating interference phenomenon shares an optical propagation path in the interferometer.

7. The optical waveform shaper according to claim 6, wherein the interferometer is a nonlinear loop mirror.

8. The optical waveform shaper according to claim 2, further comprising:

an optical source generating an optical bias with a different wavelength from that of the optical signal that has its waveform shaped by said optical waveform shaper; and guiding means for guiding the optical bias generated by said optical source to the interferometer.

9. The optical waveform shaper according to claim 2, further comprising:
a polarization control device, placed in the stage before the interferometer, which outputs the optical signal with its waveform to be shaped by the optical waveform shaper, as an optical signal with a single polarization state.

10. The optical waveform shaper according to claim 2, further comprising:
detection means for detecting differences in the optical path lengths of a pair of optical propagation paths in each interferometer;
adjustment means for adjusting at least one optical path length in the pair of the optical propagation paths; and
control means for controlling said adjustment means based on the difference in the optical path length detected by said detection means.

11. The optical waveform shaper according to claim 2, further comprising:
detection means for detecting the optical power or noise of an input optical signal;
adjustment means, placed before the interferometer, for adjusting the optical power of the input optical signal; and
control means for controlling said adjustment means based on the detection result of said detection means.

12. The optical waveform shaper according to claim 2, further comprising:
detection means for detecting the optical power or noise of an input optical signal; and
control means for adjusting the transfer function of the interferometer based on the detection result of said detection means.

13. The optical waveform shaper according to claim 2, wherein
each interferometer is a polarizing interferometer in which the substantially linear polarization of a pair of optical propagation paths is mutually perpendicular, and the mutually perpendicular linear polarizations are split and coupled by a polarizer.

14. The optical waveform shaper according to claim 13, further comprising:
an optical source generating an optical adjuster with a different wavelength from that of the optical signal that has its waveform shaped by said optical waveform shaper; and
guiding means for guiding the optical adjuster generated by said optical source to the interferometer.

15. The optical waveform shaper according to claim 13, further comprising:
a polarization device which splits an optical signal into first and second polarization element being perpendicular to one another;
first and second optical waveform shaping units which carry out waveform shaping for the first and second polarization elements, respectively; and
a polarization device which carries out the polarization-coupling of the outputs from said first and second optical waveform-shaper units.

16. The optical waveform shaper according to claim 13, further comprising:
detection means for detecting differences in the optical path lengths of a pair of optical propagation paths in each interferometer;
adjustment means for adjusting at least one optical path length in the pair of the optical propagation paths; and
control means for controlling said adjustment means based on the difference in the optical path length detected by said detection means.

17. The optical waveform shaper according to claim 2, wherein
the first and second transfer functions are controlled by phase shift caused by self phase modulation,
wherein the following four parameters a1, a2, T1, and Tm are configured so that they meet predetermined conditions, and wherein
a1 is a difference in phase shift between a pair of paths in the first interferometer proportional to unit optical power, a2 is a difference in phase shift between a pair of paths in the second interferometer proportional to unit optical power, T1 is a transmissivity in the first interferometer considering gain and loss, but disregarding interference effects, and Tm is a transmissivity considering gain between the first interferometer and the second interferometer.

18. The optical waveform shaper according to claim 17, wherein
the first interferometer has the second transfer function, and the second interferometer has the first transfer function, meeting a condition $1.5<(a2/a1)\times T1\times Tm<7$.

19. The optical waveform shaper according to claim 17, wherein
the first interferometer has the second transfer function, and the second interferometer has the first transfer function, meeting a condition $0.2<(a2/a1)\times T1\times Tm<0.8$.

20. The optical waveform shaper according to claim 17, wherein
the first interferometer has the first transfer function, and the second interferometer has the second transfer function, meeting a condition $0<(a2/a1)\times T1\times Tm<0.8$.

21. The optical waveform shaper according to claim 17, wherein
the first interferometer has the second transfer function, and the second interferometer has the second transfer function, meeting a condition $0<(a2/a1)\times T1\times Tm<3$.

22. An optical waveform shaper comprising;
a first interferometer and a second interferometer connected in series, wherein
one of the first and second interferometers has a first transfer function, where the second order derivative of output optical power in respect to the input optical power is positive when the input optical power is zero or substantially zero, and the output optical power shows substantially periodic changes with respect to the input optical power,
the other of the first and second interferometers has a second transfer function, where the second order derivative of output optical power in respect to the input optical power is negative when the input optical power is zero or substantially zero, and the output optical power shows substantially periodic changes with respect to the input optical power,
each of the first and second interferometers has first and second input ports and first and second output ports,
an optical path from the first input port to the first output port in each of the first and second interferometers provides the first transfer function, and an optical path from the first input port to the second output port in each of the first and second interferometers provides the second transfer function, and
an input optical signal is provided to the first input port of the first interferometer, the output optical signal from the first output port of the first interferometer is guided to the first input port of the second interferometer, and the second output port of the second interferometer is coupled to an output port of the optical waveform shaper.

23. An optical waveform shaper comprising;
a first interferometer and a second interferometer connected in series, wherein
one of the first and second interferometers has a first transfer function, where the second order derivative of output optical power in respect to the input optical power is positive when the input optical power is zero or substantially zero, and the output optical power shows substantially periodic changes with respect to the input optical power,
the other of the first and second interferometers has a second transfer function, where the second order derivative of output optical power in respect to the input optical power is negative when the input optical power is zero or substantially zero, and the output optical power shows substantially periodic changes with respect to the input optical power,
each of the first and second interferometers has first and second input ports and first and second output ports,
an optical path from the first input port to the first output port in each of the first and second interferometers provides the first transfer function, and an optical path from the first input port to the second output port in each of the first and second interferometers provides the second transfer function, and
an input optical signal is provided to the first input port of the first interferometer, the output optical signal from the second output port of the first interferometer is guided to the first input port of the second interferometer, and the first output port of the second interferometer is coupled to an output port of the optical waveform shaper.

* * * * *

UNITED STATES PATENT AND TRADEMARK OFFICE
CERTIFICATE OF CORRECTION

PATENT NO. : 7,631,378 B2
APPLICATION NO. : 11/094642
DATED : December 15, 2009
INVENTOR(S) : Kazuo Hironishi et al.

It is certified that error appears in the above-identified patent and that said Letters Patent is hereby corrected as shown below:

Column 25, Line 51, change "comprising:" to --comprising;--.

Column 26, Line 32, change "wherein the interferometer" to --wherein each of the interferometers--.

Column 26, Line 43, change "the interferometer" to --each of the interferometers--.

Signed and Sealed this

Thirtieth Day of March, 2010

David J. Kappos
*Director of the United States Patent and Trademark Office*